United States Patent
Facer

(10) Patent No.: US 11,367,466 B2
(45) Date of Patent: Jun. 21, 2022

(54) NON-INTRUSIVE DIGITAL CONTENT EDITING AND ANALYTICS SYSTEM

(71) Applicant: Udo, LLC, Farmington, UT (US)

(72) Inventor: Steven Ryan Facer, Fruit Heights, UT (US)

(73) Assignee: Udo, LLC, Farmington, UT (US)

( * ) Notice: Subject to any disclaimer, the term of this patent is extended or adjusted under 35 U.S.C. 154(b) by 0 days.

(21) Appl. No.: 17/062,086

(22) Filed: Oct. 2, 2020

(65) Prior Publication Data

US 2021/0104261 A1  Apr. 8, 2021

Related U.S. Application Data

(60) Provisional application No. 62/923,110, filed on Oct. 18, 2019, provisional application No. 62/911,888, filed on Oct. 7, 2019, provisional application No. 62/911,110, filed on Oct. 4, 2019, provisional application No. 62/911,113, filed on Oct. 4, 2019.

(51) Int. Cl.
*G11B 27/031* (2006.01)
*G06T 7/11* (2017.01)
*G06N 20/00* (2019.01)

(52) U.S. Cl.
CPC .......... *G11B 27/031* (2013.01); *G06N 20/00* (2019.01); *G06T 7/11* (2017.01); *G06T 2207/10016* (2013.01)

(58) Field of Classification Search
CPC ............... G11B 27/031; G06T 7/11; G06T 2207/10016; G06N 20/00
See application file for complete search history.

(56) References Cited

U.S. PATENT DOCUMENTS

| | | | |
|---|---|---|---|
| 2009/0094637 A1 | 4/2009 | Lemmons | |
| 2010/0142915 A1* | 6/2010 | McDermott | H04N 21/4622 386/343 |
| 2010/0265401 A1* | 10/2010 | Yuki | H04N 21/4316 348/565 |
| 2011/0052144 A1* | 3/2011 | Abbas | H04N 21/23418 386/240 |
| 2011/0090344 A1* | 4/2011 | Gefen | G06T 7/248 348/169 |
| 2012/0079525 A1 | 3/2012 | Ellis et al. | |

(Continued)

OTHER PUBLICATIONS

U.S. Appl. No. 14/090,748, filed Nov. 26, 2013.
U.S. Appl. No. 14/735,319, filed Jun. 10, 2015.
U.S. Appl. No. 61/730,004, filed Nov. 26, 2012.

*Primary Examiner* — Thai Q Tran
*Assistant Examiner* — Jose M Mesa

(57) ABSTRACT

Techniques for supplementing a video clip with additional information without modifying the original content included within the video clip are disclosed herein. A video clip comprising multiple video frames is generated. A layer, which is to be associated with the video clip, is also generated. This layer initializes and terminates during a duration of the video clip. An association is formed between the layer and the video clip. Layer content is added to the layer to cause the layer content to supplement content visualized by the video clip without modifying the content visualized by the video clip. In response to the video clip being played, the layer is initialized and the layer content is displayed.

13 Claims, 22 Drawing Sheets

(56) References Cited

U.S. PATENT DOCUMENTS

| | | | |
|---|---|---|---|
| 2016/0055883 A1* | 2/2016 | Soll | H04N 5/23299 386/285 |
| 2016/0133295 A1* | 5/2016 | Boyle | G11B 27/322 386/240 |
| 2019/0114485 A1* | 4/2019 | Chan | G11B 27/031 |
| 2019/0114487 A1* | 4/2019 | Vijayanarasimhan | G06K 9/00751 |
| 2020/0167699 A1* | 5/2020 | Cohen | G06Q 20/045 |

* cited by examiner

NON-INTRUSIVE DIGITAL CONTENT EDITING AND ANALYTICS SYSTEM

CROSS-REFERENCE TO RELATED APPLICATIONS

This application claims the benefit of and priority to U.S. Provisional Patent Application Ser. No. 62/911,110 filed on Oct. 4, 2019 and entitled "NON-INTRUSIVE DIGITAL CONTENT EDITING AND ANALYTICS SYSTEM," which application is expressly incorporated herein by reference in its entirety. This application also claims the benefit of and priority to U.S. Provisional Patent Application Ser. No. 62/911,113 filed on Oct. 4, 2019 entitled "VIDEO COMMUNICATION PLATFORM," which application is expressly incorporated herein by reference in its entirety. This application also claims the benefit of and priority to U.S. Provisional Patent Application Ser. No. 62/911,888 filed on Oct. 7, 2019 entitled "SYSTEM FOR STRUCTURED TIME LAPSE PHOTOGRAPHY," which application is expressly incorporated herein by reference in its entirety. This application also claims the benefit of and priority to U.S. Provisional Patent Application Ser. No. 62/923,110 filed on Oct. 18, 2019 entitled "DEVICE AND SYSTEM FOR DATA COLLECTION, COMMUNICATION AND ASSISTANCE FOR CARE OF THE ELDERLY," which application is expressly incorporated herein by reference in its entirety.

BACKGROUND

Systems used in editing video, audio, images, or documents often rely on some type of manipulation of the underlying data stream or file contents in order to add information to that content. This editing often requires a certain level of skill to accomplish and, in the case of video and audio, can be incredibly data-intensive, relying upon extensive communication and data transfer between memory and hard drive units.

Digital communication is also constantly happening all around the world at an alarming pace. For instance, users are riddled with an ever-increasing number of voice activating devices, voice assistants, smart televisions, social media platforms, and other smart Internet-of-Things (IoT) devices. Among all these different forms of communication, video is perhaps the clearest form of transferable information. Although it is extremely useful, there are still ways in which video communication can be improved. Additionally, it is often quite difficult to collect analytics on user "behavior" relative to video and audio streams because of the limited availability to capture that behavior. In other words, there are limited techniques for providing two-way communication with video streams.

With that in mind, a need exists for a system that is far less data intensive than prior art editing systems and that does not alter the underlying content. There is also a need to permit a user to add information without relying on special editing skills or training.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, mobile devices, etc.), and methods for supplementing a video clip with additional information without modifying the original content included within the video clip.

Some embodiments generate (e.g., in response to accessing a video recording) a video clip comprising multiple video frames. A layer, which is to be associated with the video clip, is generated. This layer initializes at a first point during a duration of the video clip and terminates at a second point during the duration of the video clip. Consequently, a duration of the layer spans at least some of the video frames as those video frames are played over time. The embodiments also form an association between the layer and the video clip. Layer content is added to the layer to cause the layer content to supplement content visualized by the video clip without modifying the content visualized by the video clip. In response to the video clip being played, the embodiments initialize the layer and trigger display of the layer content.

Some embodiments generate (e.g., in response to accessing a video recording) a video clip comprising multiple video frames. A layer is generated, where this layer is to be associated with the video clip. Here, this layer initializes at a first point during a duration of the video clip and terminates at a second point during the duration of the video clip. Consequently, a duration of the layer spans at least some of the video frames as those video frames are played over time. The embodiments also form an association between the layer and the video clip and add a facer ring to the layer. This facer ring is associated with a particular object identified within the video clip and is structured to track a path made by the particular object within the video frames while those video frames are being played over time. Consequently, spatial coordinates of the facer ring within the layer progressively match spatial coordinates of the particular object within the video clip. The embodiments add content to the facer ring to cause the content to be tagged to the particular object without modifying the particular object. In response to selection of the facer ring, the embodiments cause one or more portions of the content to be displayed to provide supplemental information about the particular object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
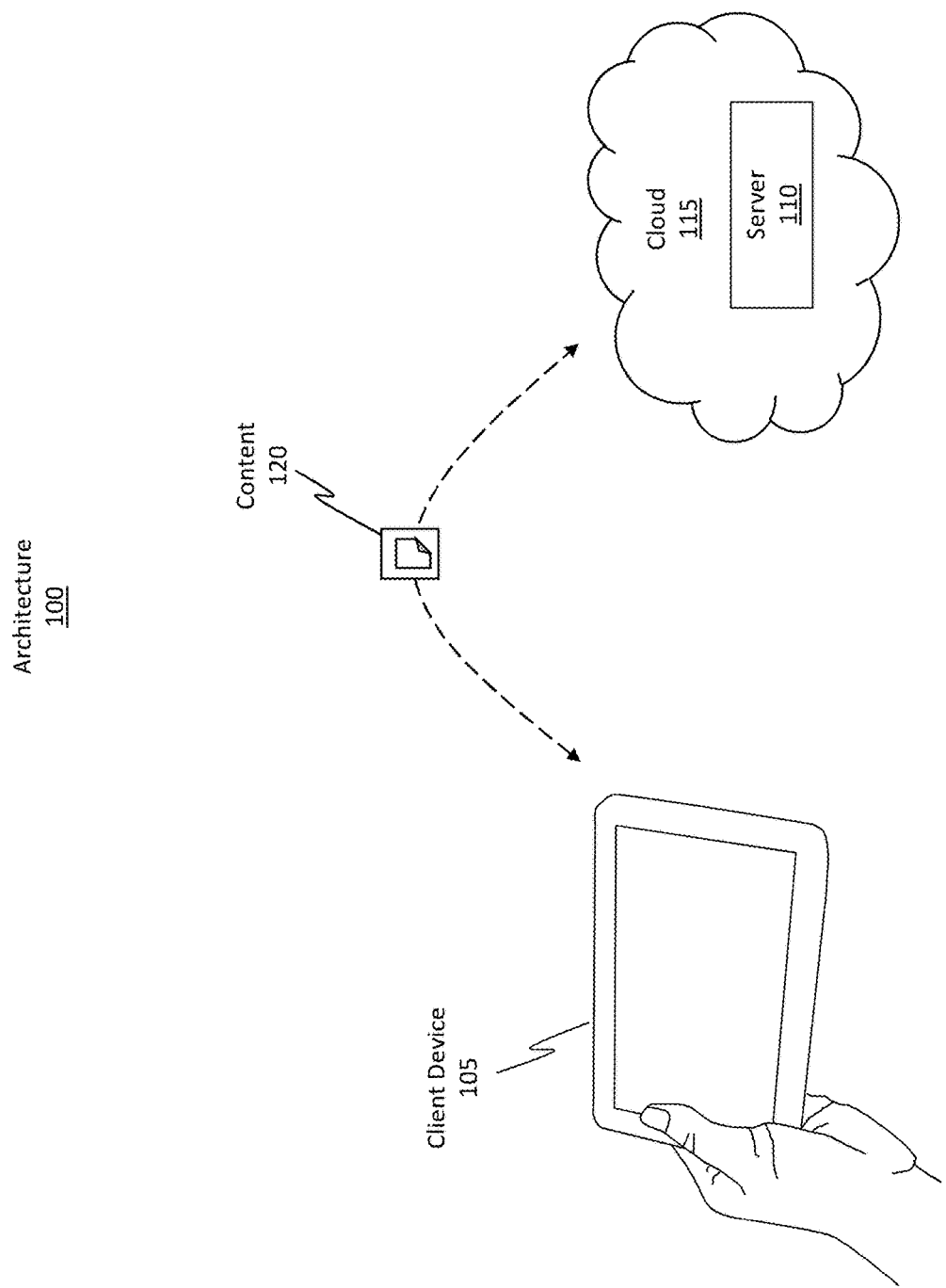
FIG. 1 illustrates an example computing architecture that may be used by the disclosed embodiments.

Embodiments disclosed herein relate to systems, devices (e.g., hardware storage devices, wearable devices, mobile devices, etc.), and methods for supplementing a video clip with additional information without modifying the original content included within the video clip.

Some embodiments generate (e.g., in response to accessing a video recording) a video clip comprising multiple video frames. A layer, which is to be associated with the video clip, is generated. A duration of the layer spans at least some of the video frames as those video frames are played over time. The embodiments also form an association between the layer and the video clip. Layer content is added to the layer to supplement the video clip's content without modifying the video clip's content. In response to the video clip being played, the embodiments initialize the layer and trigger display of the layer content.

Some embodiments generate (e.g., in response to accessing a video recording) a video clip comprising multiple video frames. A layer is generated, where this layer is to be associated with the video clip. A duration of the layer spans at least some of the clips video frames. The embodiments also form an association between the layer and the video clip and add a facer ring to the layer. This facer ring is associated with a particular object identified within the video clip and is structured to track a path made by the particular object within the video frames. Consequently, spatial coordinates of the facer ring within the layer progressively match spatial coordinates of the particular object within the video clip. The embodiments add content to the facer ring to cause the content to be tagged to the object without modifying the object. In response to selection of the facer ring, the embodiments cause one or more portions of the content to be displayed to provide supplemental information about the particular object.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous different improvements, advantages, and practical applications to the technical field. Specifically, the disclosed embodiments are beneficially able to add information or content to an underlying video, audio, image, or document file without intruding upon or altering the underlying content. The embodiments are able to perform these beneficial operations through the use of a "layer" that is overlaid onto the original content. Using these layers, the embodiments are able to dynamically add information that is designed to supplement the underlying content without modifying that underlying content. Examples of supplemental content include, but are not limited to, user-added commentary, social media links and other information, hyperlinks or links to external web pages, e-commerce features (e.g., "buy it now" options), videos, audio, text, and so forth. Because the embodiments do not manipulate the underlying content, the augmentation process (i.e. adding layers and content to those layers) is far less data intensive than conventional editing technologies.

The embodiments are also beneficially configured to provide a specialized layering construct referred to herein as a "facer ring." This facer ring allows supplemental content to be linked or associated with a specific object identified or recognized within the underlying content. The facer ring is also configured to track any movements of the underlying object so users can readily identify what the facer ring is associated with while the video clip is being played.

The disclosed embodiments also beneficially allow users to identify points of interest in space and time inside any video or other content and to then supplement that video with additional content within a layer that is overlaid onto the original video. Once the supplemental content has been added, the user or any number of other users can interact with the supplemental content, thereby enriching their experiences with the content. Adding supplemental content via the use of layers provides a clean canvas on which to share new insights, new data, and new perspectives without cluttering the original content included in the video. The layers are configured in a manner so as to intelligently organize the supplemental content in a searchable and perhaps even a hierarchical manner. The compilation of the supplemental data in this manner allows data to be easily shared, saved, retrieved, commented on or collaborated on, purchased, sold, or attached to other data. In effect, the embodiments provide a two-way platform in which content creators and downstream users of the original content can collaborate and interact. This new computing architecture improves how communication is performed by allowing that communication to occur inside the video itself via use of the disclosed layers.

The disclosed embodiments also improve a user's video creation and viewing experience by providing a platform to link any content to specific points in time and space in a video presentation. The disclosed embodiments also allow multiple users to add and share content with original content creators in an efficient and seamless manner. Analytics are also available to allow interested parties to identify characteristics of video popularity (e.g., the analytics can be used to reveal which specific parts of a video are the reason why a video may go "viral"). These and numerous other benefits will now be discussed in detail throughout the remaining portions of this disclosure.

Example Architectures and Environments

Attention will now be directed to FIG. 1, which illustrates an example computing architecture 100 which may be used by some of the disclosed embodiments. Architecture 100 is shown as including a client device 105 and a server 110 operating in a cloud 115 environment. Client device 105 may be any type of client device, without limit. Examples of client devices include, but certainly are not limited to, any type of desktop computer, laptop computer, smart phone, tablet, any type of mobile device, or any type of Internet-of-Things (IoT) device, without limit. Similarly, the server 110 may also be implemented as any type of computing device capable of hosting content. The server 110 is shown as being in the cloud 115. The cloud 115 is representative of any type of computing network, whether it be a local area network (LAN) or a wide area network (WAN) (e.g., the Internet) or whether it is connected to a LAN and/or a WAN.

The server 110 is able to host content and transmit that content to the client device 105, as shown by content 120. Additionally, the server is able to receive content from the client device 105. In this fashion, the client device 105 and the server 110 are able to transmit and receive content 120 from one another. Content 120 may be any type of data, without limit. Examples of content 120 include, but are not limited to, video content, audio content, text content, live-streamed content, prerecorded or pre-saved content, and so forth. Accordingly, architecture 100 may be used to provide content 120 to the client device 105. In accordance with the disclosed principles, the embodiments are able to at least transmit video content to the client device 105 and are able to provide supplemental content that will be used to supplement the original content included in the video stream.

Figure 2:
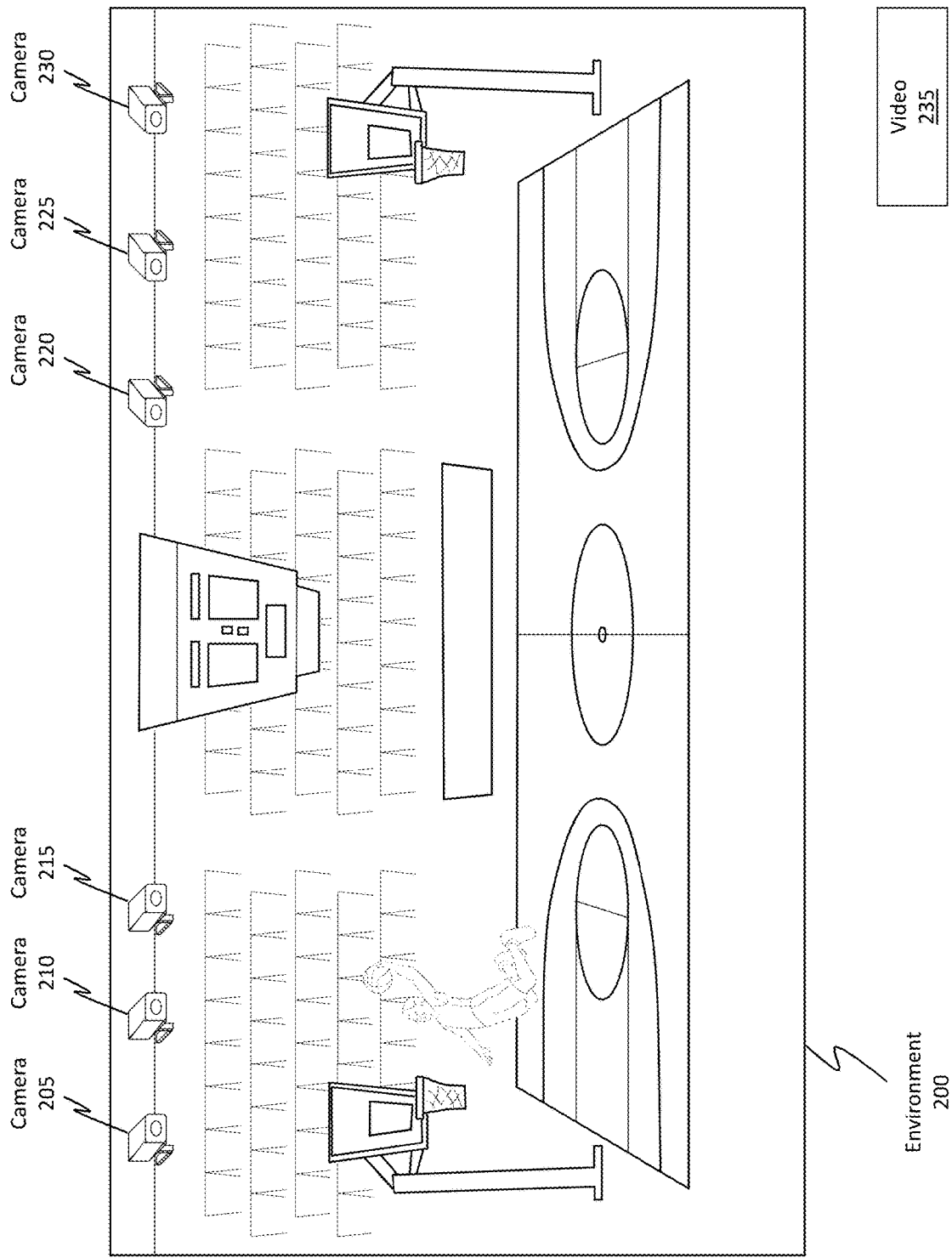
FIG. 2 illustrates an example environment in which the principles disclosed herein may be used.

FIG. 2 illustrates an example environment 200 in which the principles disclosed herein may be practiced. Environment 200 is illustrated as being a sporting environment, but the embodiments should not be restricted to such environments. Indeed, the disclosed principles may be used in any environment in which video content is being generated. Examples of such environments include, but are not limited to, the healthcare industry, learning environments (e.g., school), travel environments (e.g., cars, planes, airports, etc.), and so on, without limit.

Environment 200 is shown as including any number of cameras, including cameras 205, 210, 215, 220, 225, and 230. Although there are six cameras illustrated in FIG. 2, any number of cameras may be used (e.g., 1 camera, 2, 3, 4, 5, 6, 7, 8, 9, 10, and more than 10). In any event, the cameras are able to individually or collectively generate a video 235, or rather a video recording. The video 235 may be a live-streaming video that is being cached on the client device or on the server, or it may be a prerecorded video that is being transmitted to the client device, or it may be a video that was streamed to the server, cached at the server, and then delivered to the client device. In some cases, the video 235 may be uploaded to the server 110 from FIG. 1 and converted to a particular format, such as perhaps an mp4 format. This format permits selection or trimming of the formatted content. Additional features regarding trimming will be provided later.

Figure 3:
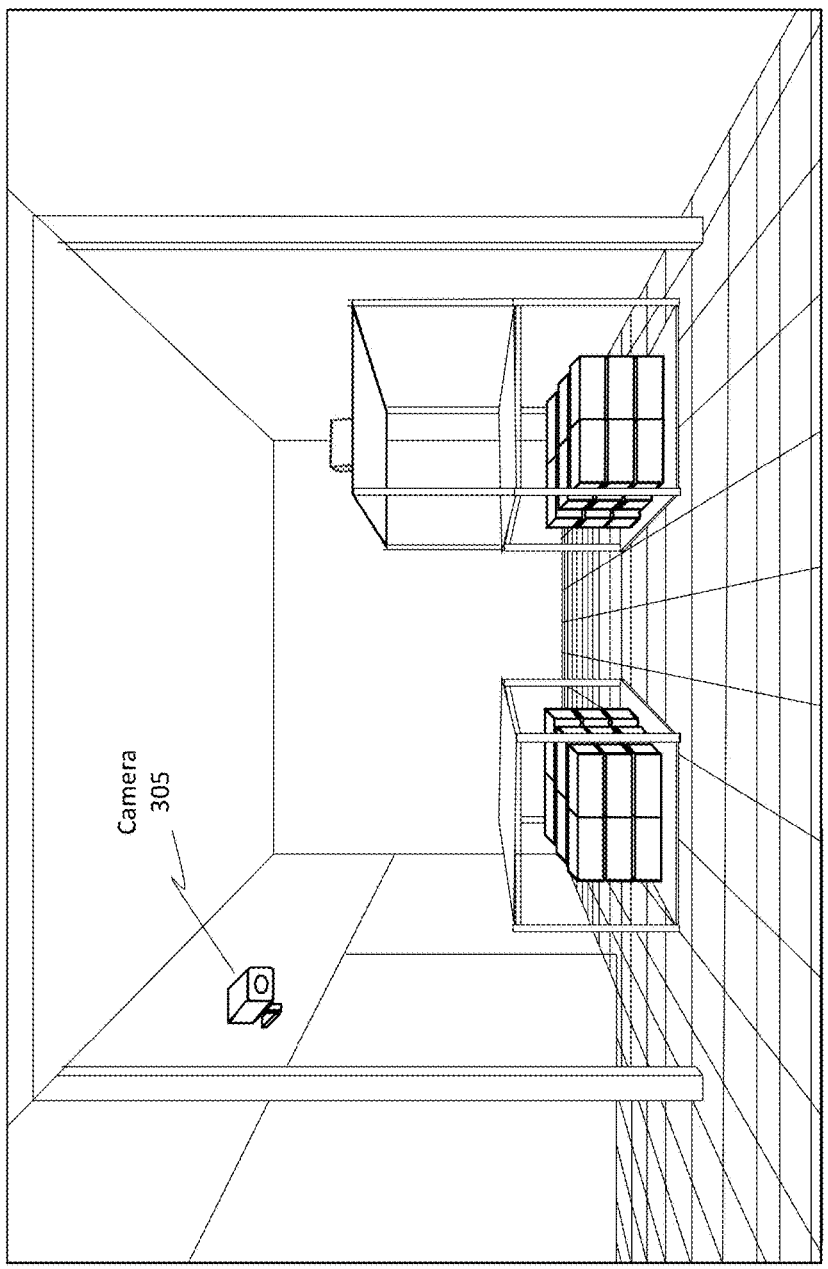
FIG. 3 illustrates another example environment in which the embodiments may be practiced.

FIG. 3 illustrates another example environment 300 in which the embodiments may be practiced. Here, environment 300 illustrates a warehouse in which a single camera 305 is generating a video 310. Accordingly, the disclosed principles may operate on video recordings produced by any number of cameras situated in any type of environment.

Generating Video Clips from Video Recordings

Figure 4:
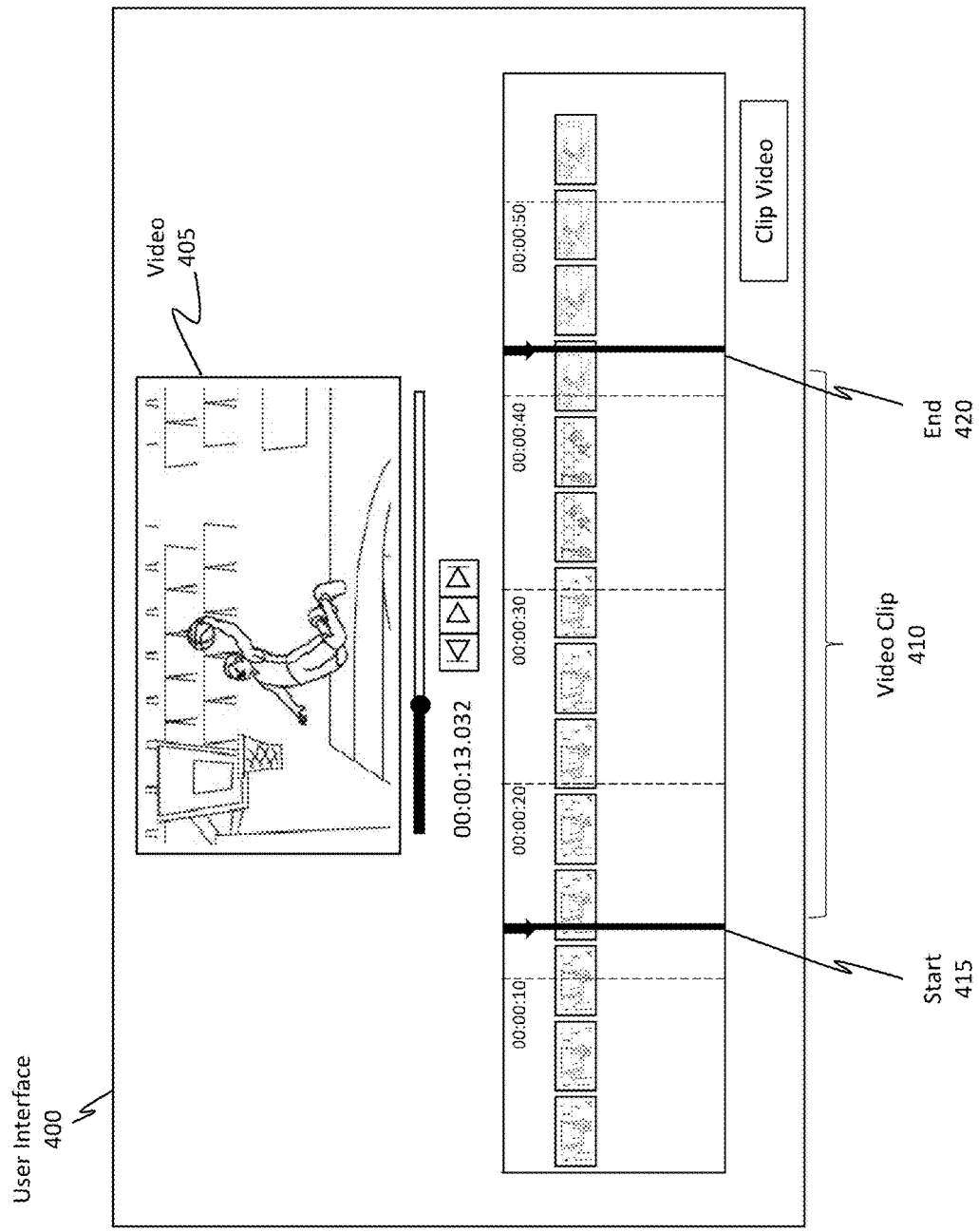
FIG. 4 illustrates an example user interface configured to enable video editing.

FIG. 4 illustrates an example user interface 400 that may be displayed on the client device 105 of FIG. 1. This user interface 400 is currently displaying a video 405, which is representative of the video 235 from FIG. 2 and the video 310 from FIG. 3. The video 405 may be a live-streamed video that is being cached by the client device 105 or it may be a pre-recorded video that is being transmitted to the client device 105, such as from the server 110.

In accordance with the disclosed principles, the embodiments are able to generate a video clip 410 of the video 405. As used herein, a "video clip" refers to a new video that is created from or that is based on a different video recording. In some instances, the video clip may be a duplicate or a copy of the different video recording. In some instances, the video clip may be a subsegment of the different video recording. In some cases, the duration of the video clip may be the same as the duration of the different video recording while in other cases the duration of the video clip may be shorter than the duration of the different video recording.

In the example illustrated in FIG. 4, the duration of the video clip 410 is shorter than the duration of the video 405. For instance, the start 415 indicator and the end 420 indicator are provided to visually illustrate how the duration of the video clip 410 is shorter than a duration of the video 405. The start 415 indicator and the end 420 indicator may be manipulated to adjust the duration or the time span of the video clip 410 to be larger or smaller.

For instance, moving the start 415 indicator to the left will increase the duration of the video clip 410 relative to its current duration and moving the start 415 indicator to the right will decrease the duration of the video clip 410 relative to its current duration. Similarly, moving the end 420 indicator to the right will increase the duration of the video clip 410 relative to its current duration and moving the end 420 indicator to the left will decrease the duration of the video clip 410 relative to its current duration. In this regard, the user interface 400 may be used to generate a video clip 410 based on the video 405. Additional editing operations may be provided by the user interface 400. For instance, the user interface 400 may be used to stitch or merge multiple sections of the video 405 together in order to generate the video clip 410.

Although FIG. 4 shows a scenario in which the video clip 410 is shorter in duration than the video 405, that may not always be the case. That is, in some scenarios, the duration of video clip 410 may actually be the same as the duration of the video 405.

Object Segmentation Using Machine Learning

Figure 5:
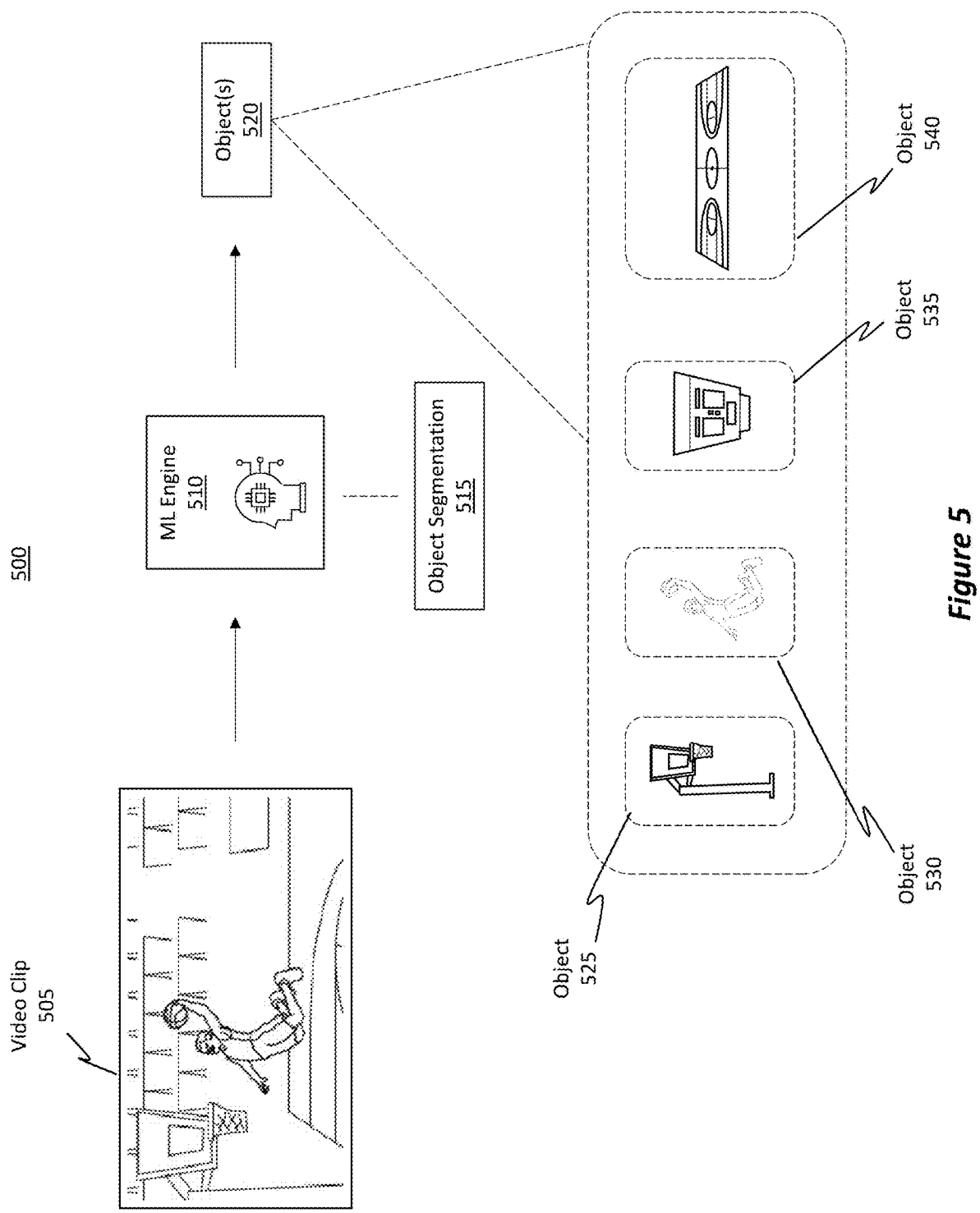
FIG. 5 illustrates how machine learning may be used to perform object segmentation on a video clip.

After a video clip is generated, the embodiments are able to use machine learning (ML) to perform object segmentation or object recognition on the resulting video clip. FIG. 5 is representative of these features.

FIG. 5 illustrates a flow 500 of an example process in which a video clip 505 is fed as input into a ML engine 510. Here, the video clip 505 is representative of the video clip 410 in FIG. 4. The ML engine 510 is structured to perform object segmentation 515 in order to identify object(s) 520 and even speech (e.g., key words) that are present in the video clip 505.

For instance, the ML engine 510 is able to identify object 525 (i.e. the basketball hoop), the object 530 (i.e. the player), the object 535 (i.e. the large score board), and object 540 (i.e. the court). The ML engine 510 is able to identify any number of objects based on its training. Additionally, the ML engine 510 is able to analyze speech or sounds to identify key words that may be spoken. For example, it may be the case that an event host mentions a particular player's name. The ML engine 510 is able to parse the speech and extract the player's name. The ML engine 510 can then associate that name with the player in the actual video.

As another example, it may be the case that language is being spoken and there is a mention of a particular product that is perhaps being displayed (or not displayed). The ML engine 510 is able to parse the language and identify the particular product. As will be discussed in more detail later via a specific example, the embodiments are able to generate supplemental content based on the identified visible objects and even based on spoken words.

Any type of ML algorithm, model, or machine learning may be used to implement the ML engine 510. Indeed, as used herein, reference to "machine learning" or to a ML model or engine may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

While the example illustrated in FIG. 5 focused on the sporting environment and the sporting video clip represented in FIG. 2, one will appreciate how the ML engine 510 will be able to review and analyze any type of video clip, file, text, document, or speech and will be able to identify any number and any type of objects. For instance, suppose the video clip is of a tooth extraction procedure where an oral surgeon is removing a patient's tooth. The ML engine 510 will be able to segment and identify the oral surgeon, the patient, the patient's teeth, the tools used by the oral surgeon, and even any speech uttered in the operating room. Accordingly, the ML engine 510 may be applied to any video clip (or other form of data) that captures any type of scenario. Additional description regarding object recognition and tracking will be provided later.

Adding Layers to Video Clips

Figure 6:
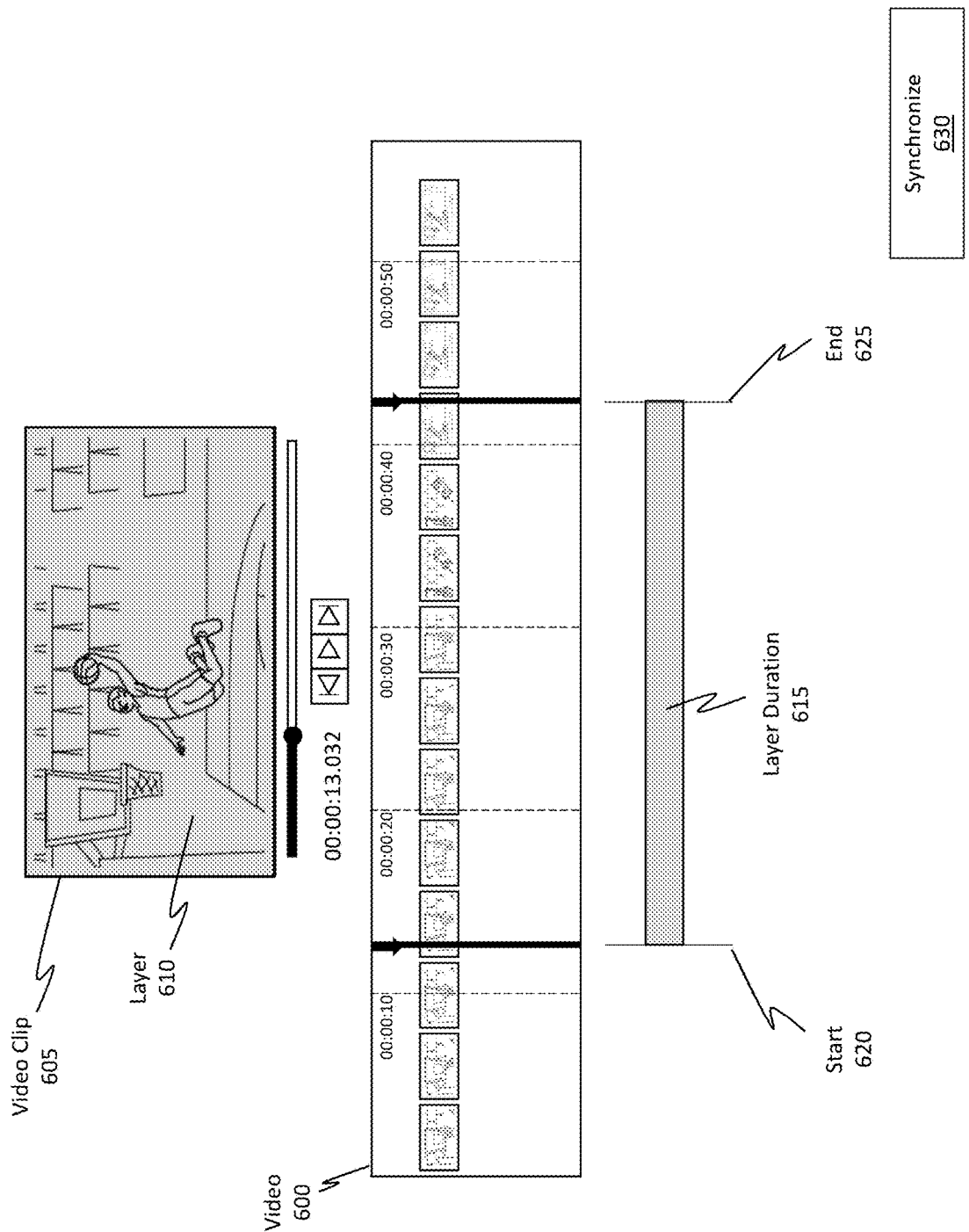
FIG. 6 illustrates how a layer can be associated with a video clip.

FIG. 6 illustrates an example video 600, which is representative of the video 405 from FIG. 4, as well as a resulting video clip 605, which is representative of the video clip 505 from FIG. 5 and the video clip 410 from FIG. 4. In accordance with the disclosed principles, the embodiments are able to generate a layer 610 and place that layer 610 over top of the video clip 605.

As used herein, the term "layer" or "layering" refers to a programming organization or scheme in which different computing components function and interact within one another in a hierarchical and potentially sequential manner. In this regard, content included in one layer may be manipulated and modified without impacting the content included in a different layer. As such, layering allows for independent object management and editing. A "layer" can be viewed as a (potentially) transparent piece of canvas superimposed over the video. Layering enables the ability to supplement a video without modifying the video itself.

The disclosed embodiments are able to add one or more layers onto the video clip 605 and add content to those layers. By adding content to the layers, the original underlying content included in the video clip 605 may be left unmodified or unedited, even when modifications and edits are being made to content included in the stacked layers positioned over top of the video clip 605. The layer 610 is related to the video clip 605 in both a spatial context (e.g., pixel coordinates are aligned as between the video clip 605 and the layer 610) as well as in a timing context. This timing context is discussed in more detail below.

The duration of the layer, or the layer duration 615, may be set to any duration that is less than or equal to the duration of the video clip 605. For instance, the start 620 indicator may be manipulated to adjust when the layer starts, and the end 625 indicator may be manipulated to adjust when the layer ends. The layer 610 is synchronized (as shown by synchronize 630) with the video clip 605 so that spatial coordinates and timing attributes of the layer 610 align with spatial coordinates and timing attributes of the video clip 605.

As will be discussed in more detail momentarily, layer content may be added to the layer 610 in order to supplement the content provided by the video clip 605. In some cases, the layer 610 may be transparent, partially transparent, or opaque. Further details on features of the layer will be provided later.

Figure 7:
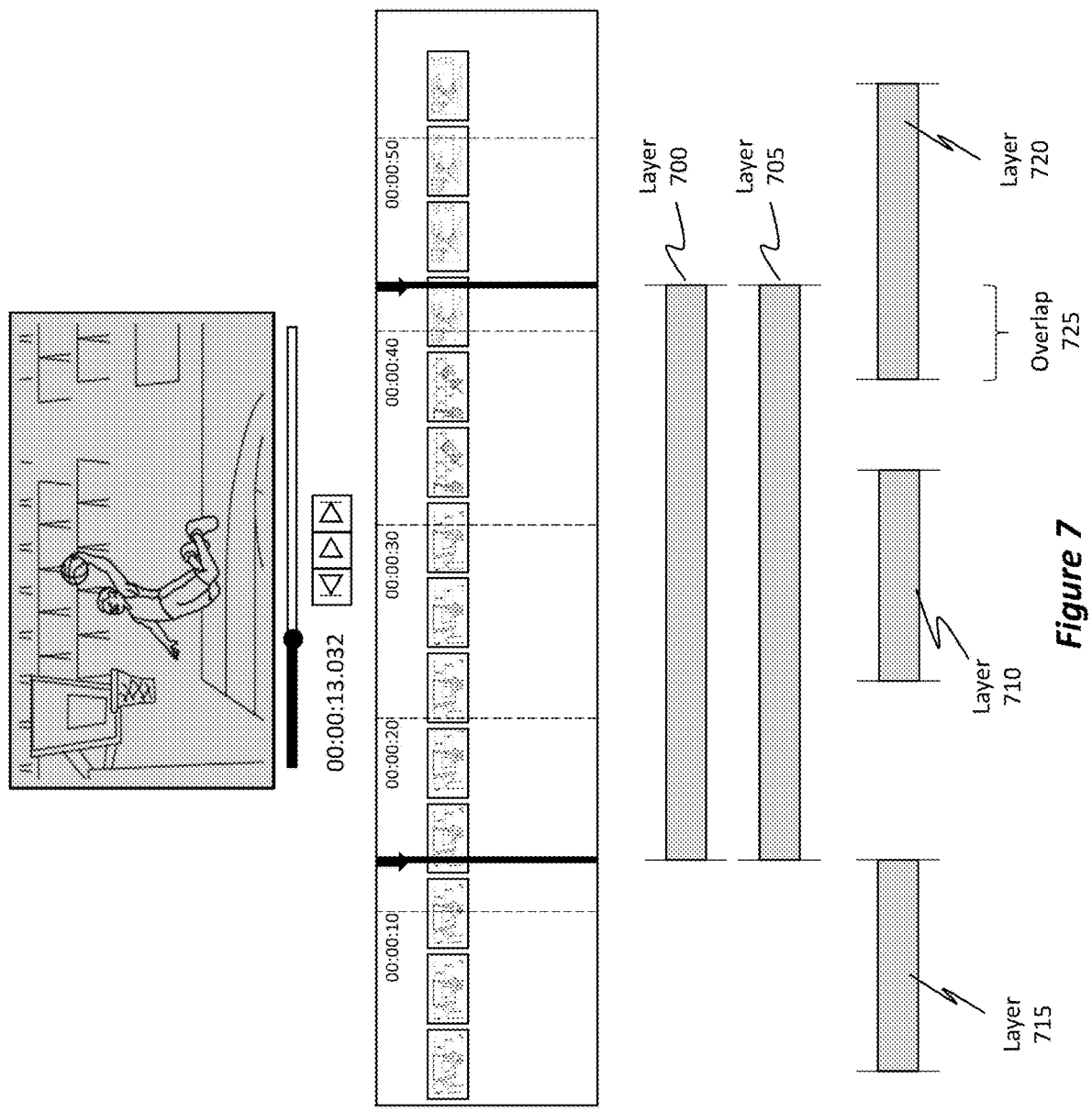
FIG. 7 illustrates how multiple layers can be associated with a video recording or clip.

FIG. 7 illustrates another example layer 700, which is representative of the layer 610 from FIG. 6. The embodiments are able to support any number of layers that may be added to supplement the underlying video clip. For instance, FIG. 7 shows layer 700, a second layer 705, and even a third layer 710 all associated with the same video clip. Accordingly, in some embodiments, a second layer (or any number of layers) is also associated with the video clip.

Here, the layer 700 and 705 start and end at the same time such that their durations are the same. In contrast, the start and end times of the layer 710 are different. Specifically, the duration of the layer 710 is shorter than the duration of the layers 700 and 705. What this means is that the layer 710 will not be initialized until the underlying video clip has been playing for a period of time, and the layer 710 will terminate prior to the underlying video clip ending. As such, any layer content provided by the layer 710 will be available for a shorter period of time than the duration of the video clip.

Additional layers may be associated with other video clips that are generated from the original video recording. For instance, layers 715 and 720 are different layers associated with different video clips. In this example case, the video clip associated with layer 720 includes some overlapping content with the video clip associated with layer 700, as represented by the overlap 725. Accordingly, any number of video clips may be generated from a video recording, and any number of layers may be added to a single video clip.

Figure 8:
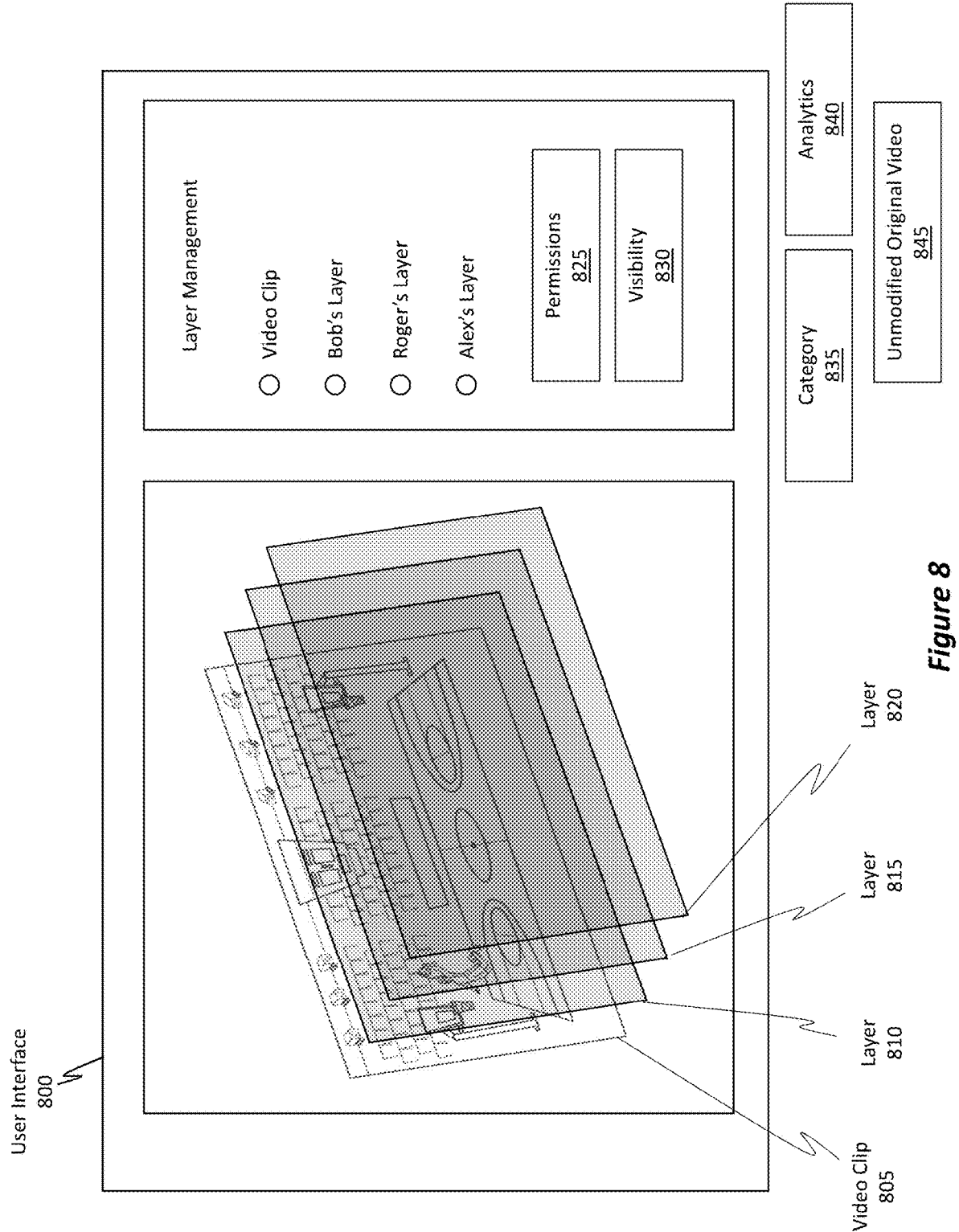
FIG. 8 provides another illustration regarding how multiple layers can be associated with a video recording or with a video clip.

FIG. 8 illustrates an example user interface 800 configured to manage the layers that are generated. User interface 800 is shown as displaying a video clip 805, which is representative of the video clip 605 from FIG. 6, and layers 810, 815, and 820, which are representative of the layers mentioned earlier. Layers 810, 815, and 820 are all layers that have been generated for the video clip 805. Although only three layers are illustrated, one will appreciate how any number of layers may be generated.

The user interface 800 is configured to allow a user or administrator to manage the layers 810, 815, and 820. For instance, each of the layers may be named a particular way. In this example case, layer 810 is named "Bob's Layer;" layer 815 is named "Roger's Layer;" and layer 820 is named "Alex's Layer."

Different permissions 825 may be applied to each of the different layers as well. For instance, a first set of permissions may be applied to layer 810 while a second set of permissions may be applied to layer 815. The permissions 825 can be set to govern the operations and behavior of the layers. For example, the permissions 825 may govern what type of content can be added to a layer. That is, some content may be appropriate for children to view and interact with while other content may be appropriate only for adults to view and interact with. The permissions 825 can control not only what type of content is displayed in a particular layer but also which type of users are able to view and interact with that content. The permissions 825 can also govern times of day or days of the week when the content is available to view and interact with. The permissions 825 can also govern the longevity or lifespan of a layer. As an example, the permissions 825 may set expiration dates and times for layers, where the layers will automatically terminate once the expiration date and time arrives.

The permissions 825 may also govern which entities are permitted to add, modify, or delete content from a particular layer. The permissions 825 can also be used to perform authentication, where a user may be required to submit an authentication credential prior to adding, modifying, deleting, or perhaps viewing or interacting with the layer content. In this fashion, permissions 825 may be used to govern how layers are used and even how layers are interacted with. Accordingly, a first set of permission may be associated with a first layer, and a second set of permissions may be associated with a different layer.

The visibility 830 is structed to control the visibility of content provided by a layer. Visibility 830 may refer to the ability to control when content will appear or disappear in the layer while the underlying video clip is playing. Visibility 830 may also refer to the ability to visibly hide layer content yet still allow that content to be associated with the underlying video clip. For instance, even though the layer content may be hidden from view, it may be the case that the layer content is still searchable. Consequently, when a search is conducted against the video clip (or perhaps even the original video recording), the search results may include the layer content included in the layer associated with the video clip. As such, users are able to tag or associate supplemental content with a video while retaining the ability to hide that supplemental content.

In some cases, layers may be organized based on a determined type of category 835 they fall within. For example, using the sporting example, one category may include statistics for players while another category may include start times of the sporting events for a particular team. There may also be merchandise-specific categories, marketing categories, informational categories, and so forth. The layers may be categorized by type and even by use (e.g., by users interacting with the layers). As such, interaction with the layers can be tracked and analytics may be generated, as will be discussed further below.

Any type of category may be defined, including subcategories of a parent category. As such, a hierarchical data tree structure may be defined using the different categories. Different permissions may be applied to a particular category, and those permissions may then permeate to any layer included within that particular category.

Analytics 840 may also be collected or generated. By way of example, it may be the case that the analytics 840 track (e.g., using an analytics engine) the number of users who view and interact with content from a particular layer. The analytics 840 can be analyzed to determine which type of content is most viewed or interacted with and can also provide recommendations or predictions indicating why that content was most viewed and/or interacted with. By way of example, it may be the case that a particular layer has content structured in a highly aesthetic manner, which causes an increase in viewings. The analytics 840 can analyze the positional framework of content included within a layer and submit recommendations for users who generate other layers in an attempt to increase the views and interactivity with those other layers.

Analytics 840 can also be used to provide viewing data to the original creator of the video. For example, if users are interacting with a video clip and with the layers associated with that video clip, the embodiments are able to determine the number of views and interactions and then provide that data to the original source of the video recording. Doing so will enable the original source to publish an accurate accounting of the number of users who have viewed and interacted with the content. Such a feature is particularly beneficial because it is often the case that advertising agencies pay based on the number of views. By providing the analytic data to the original source of the video recording, the embodiments are able to facilitate an accurate determination regarding how many views videos receive. Accordingly, in some cases, the analytics 840 may include video metrics, which are generated for the video clip. These video metrics may include a count reflecting a number of views the video clip has had. Furthermore, the video metrics may be transmitted to a host of the video recording.

As touched upon earlier, the analytics 840 also allow interested parties to identify characteristics of video popularity. For instance, the analytics 840 can be used to reveal which specific parts of a video are the reason why a video may go "viral." The analytics 840 can measure or record the number of video views, the number of layer content views (including facer ring views, as will be discussed later), the number of comments for a video or layer content, and so forth. This data can be used to determine a video's popularity and even which specific portion of the video made it popular or viral. This analytic data gives content creators additional insight regarding viewing popularity and can provide a feedback mechanism for altering how future videos are created in order to capitalize on popular or viral video traits/characteristics.

By associating layers with the video clip 805, the embodiments provide a framework in which new content can be used to supplement the video clip 805 while at the same time refraining from modifying the content included in the video clip 805, as represented by unmodified original video 845. That is, the content displayed in the video clip is left unmodified. Instead, new content is added to the layers, which are then associated with the video clip. Structuring the framework in this manner helps to avoid issues that may occur when editing another user's video.

Layer Content Used to Supplement Video Clips

Figure 9:
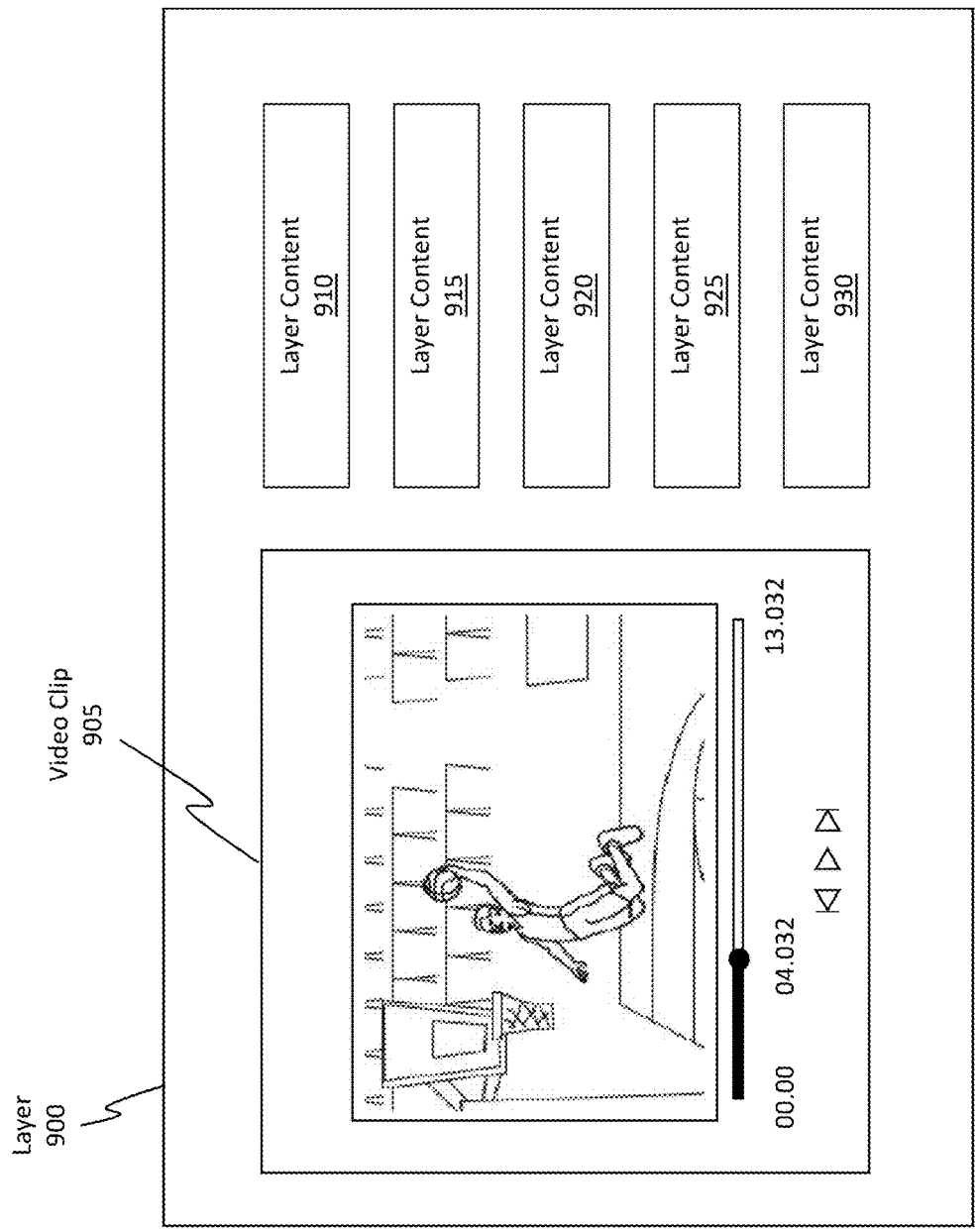
FIG. 9 illustrates how content can be added to a layer without modifying the underlying content of the original video clip.

FIG. 9 illustrates an example layer 900, which is representative of any of the layers mentioned thus far. In this example illustration, the layer 900 is being used to supplement a video clip 905, which is representative of the video clips mentioned thus far.

Here, the layer 900 includes layer content 910, 915, 920, 925, and 930. Although only five different pieces of content are illustrated, one will appreciate how the layer 900 may include any amount of content, without limit. The layer content is supplementing the content displayed by the video clip 905. Different content may be displayed at different time periods as the video clip 905 is played. For instance, it may be the case that layer content 910 is displayed during the first five seconds when video clip 905 is played, and layer content 915 is displayed during the next five seconds when video clip 905 is played. Of course, the layer content may be displayed at any time during the playback of video clip 905.

Identification information may be attached to each layer content that is added to a layer. For instance, each layer content may have metadata identifying when the layer content was added to the layer, when the layer content was last modified, the author of the layer content, an identifier for the layer content, a version number of the layer content, and so forth. The embodiments are able to maintain a database or repository listing the different layer content items that have been created. This repository is searchable or discoverable and can help further enrich the user's experience in creating layer content. Additional details on this searching feature will be provided later.

Figure 10:
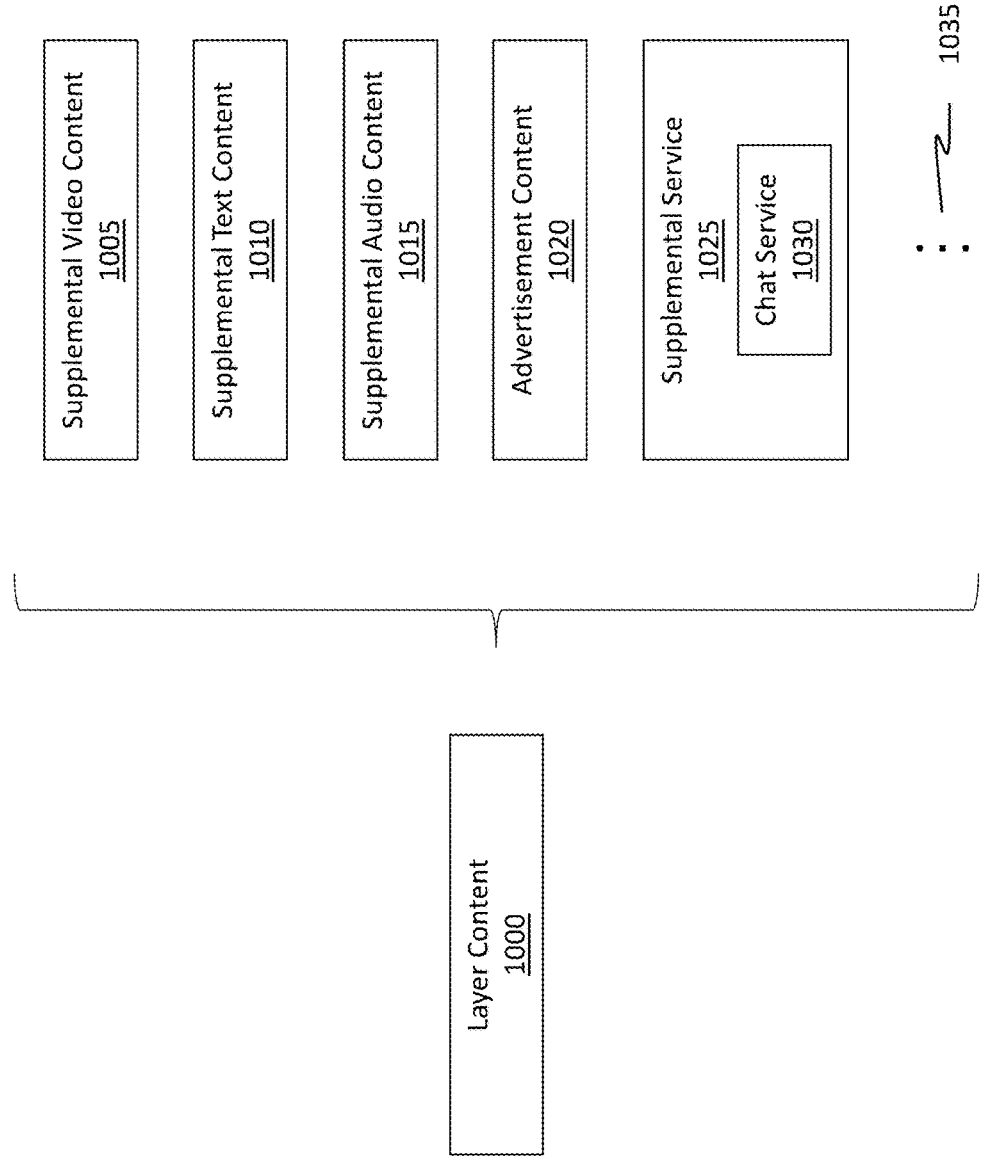
FIG. 10 illustrates different forms the layer content may have.

FIG. 10 provides a useful illustration regarding the type of content that may be included in the layer content 1000, which is representative of any of the layer contents 910, 915, 920, 925, and 930 from FIG. 9. In some implementations, the layer content 1000 may be or may include one or more of supplemental video content 1005, supplemental text content 1010, supplemental audio content 1015, advertisement content 1020, or even a supplemental service 1025 (e.g., perhaps a chat service 1030), or any combination of the above. The ellipsis 1035 is provided to show that other forms of supplemental content may be used as well, without limit. Another example of layer content may include marketing content or even purchase content (e.g., a "buy it now" option). For instance, the "buy it now" option may be associated with a particular object identified in the underlying video, and the "buy it now" option may include shopping cart features usable to enable the user to buy the displayed product. Additional content that may be included in layer content 1000 includes any type of images, documents, spreadsheets, presentations, pdf files, and audio files.

The supplemental video content 1005 may be any type of video content. For instance, it may be a new recording of a user's reaction to the content displayed in the video clip. Additionally, or alternatively, it may be an existing recording that the user adds to the video clip to supplement that clip. By way of example and using the sporting example, the user may add a highlight reel to show other instances where a particular player excelled or perhaps floundered.

The supplemental text content 1010 includes any type of text, including news articles or publications, pdfs, documents, tables, live-streaming text, text added by a user, and so forth. The supplemental text content 1010 may be used to provide additional context for an event occurring within the video clip.

The supplemental audio content 1015 may include any type of audio recording. Examples include a user's reaction to the events occurring within the video clip, a narration of the events, a gag reel, and so forth.

The advertisement content 1020 may include advertisements, promotions, marketing, or any other type of offer. For instance, a layer may be created to emphasize the type of shoe a particular player is wearing or a particular tool an operator is using. The layer can include a hyperlink or other identifying information to identify the product. The layer can include supporting description for the product and can include information on how or where to purchase the product.

The supplemental service 1025 may include any type of cloud computing service or other service, without limit. One example includes a live-streaming chat service 1030 where multiple users are able to converse with one another within the layer to discuss the events occurring in the video clip. Additionally, or alternatively, the chat service 1030 can be used to connect potential buyers to the seller of a product.

Another example of a service that may be included in the supplemental service 1025 is a service that provides augmented reality holograms or virtual content to the video clip. For instance, suppose a basketball player just made a three-point shot. The augmented reality service can be used to generate a hologram that tracks the ball from the point in time when the ball left the player's hands to the time when the ball enters the hoop. Virtual reality fireworks can then be added at the hoop to represent a celebration when the basket is made. Indeed, any type of virtual reality content can be added to a layer using a virtual reality service.

Figure 11:
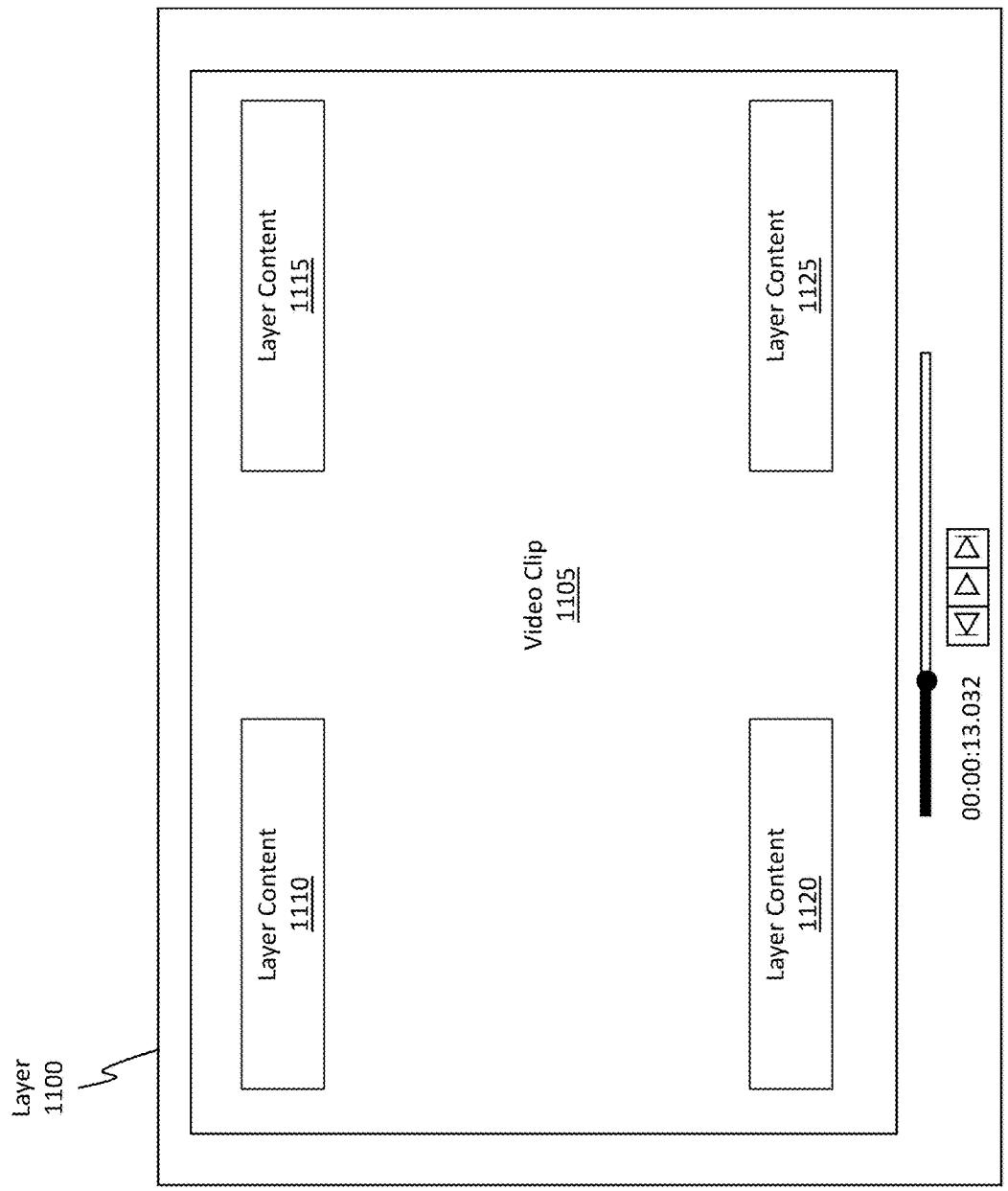
FIG. 11 illustrates how layer content can be displayed over top of portions of the underlying video clip.
Figure 12:
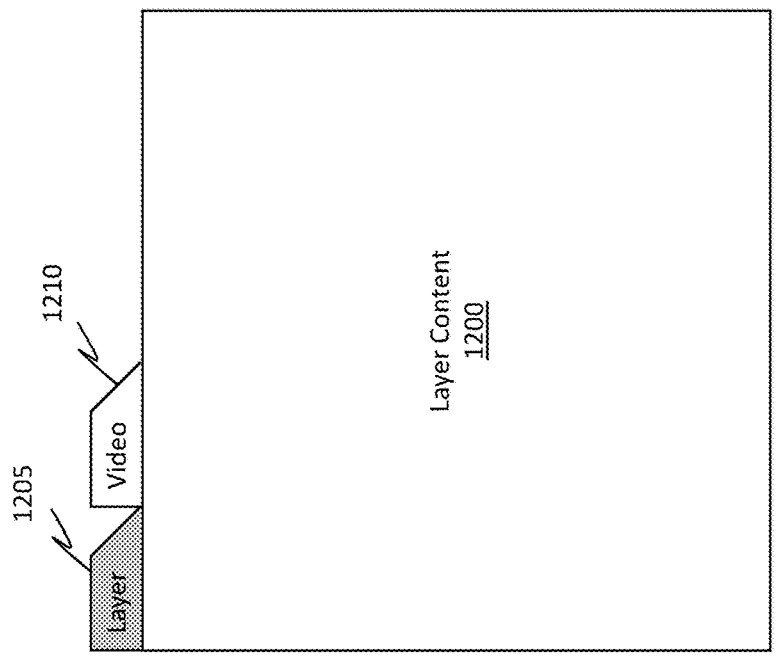
FIG. 12 illustrates how layer content can be displayed without displaying the underlying video clip.

FIG. 11 illustrates an example layer 1100, which is representative of the layers discussed thus far. Layer 1100 is linked, connected, or otherwise associated with a video clip 1105, which is representative of the video clips mentioned thus far. In this example scenario, layer content (e.g., layer content 1110, 1115, 1120, and 1125) are displayed as overlapping (or at least partially overlapping) or being on top of the content displayed by the video clip 1105. That is, some embodiments display layer content proximately to, but not overlapping, the content of a video clip, as was shown in FIG. 9, while some embodiments display layer content on top of a video clip's content, as is shown in FIG. 11. Some embodiments, as shown in FIG. 12, display layer content without displaying the video clip. In some cases, the layer content is displayed simultaneously with the video clip.

FIG. 12 shows layer content 1200 being displayed in a tab 1205. Tab 1210 is a tab used to display video content. Notice, the layer content 1200, even though it is associated with a particular video, is being displayed independently of any video content of a video clip. The use of tabs in this Figure is for example purposes only. Some embodiments use tabs to separate content while other embodiments may use other techniques for separating content, such as by displaying different windows. Accordingly, some embodiments display layer content with content provided by a video clip while other embodiments display layer content without displaying content provided by a video clip.

Facer Rings

Figure 13:
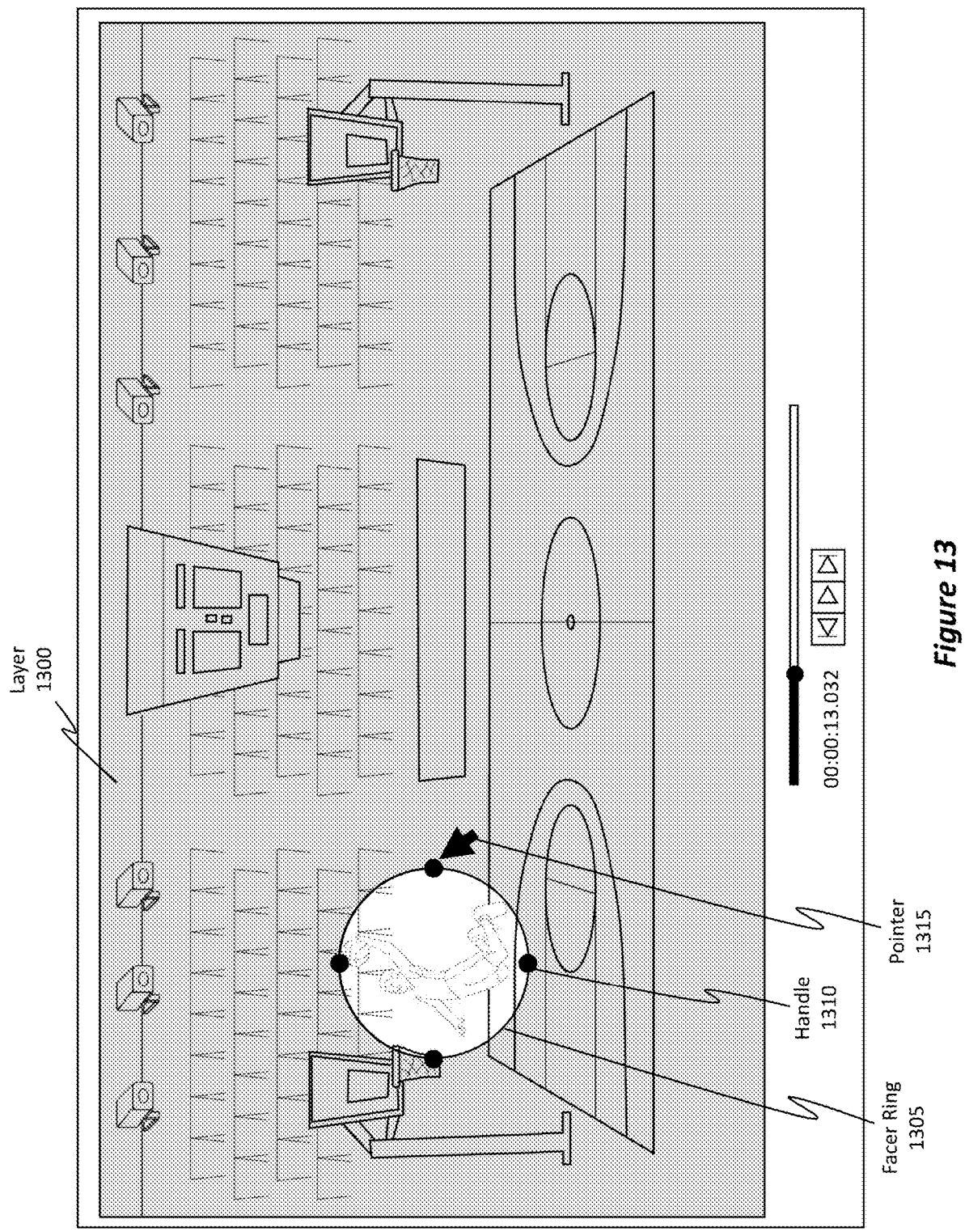
FIG. 13 illustrates how a facer ring can be added to a layer, where the facer ring is used to provide focused supplemental content for a particular object identified within the underlying video clip.

Having just described some of the features of layers and how they may be used to supplement content provided by a video clip, attention will now be directed to FIG. 13, which illustrates a unique layering component or construct that may be used to further enrich a user's experience with a computer system. Specifically, FIG. 13 illustrates a layer 1300, which is representative of the layers mentioned thus far. In accordance with the disclosed principles, however, the embodiments are able to provide a new layering construct referred to herein as a "facer ring," which is represented in FIG. 13 as the facer ring 1305. The facer ring 1305 is able to provide a two-way communication interface for connecting viewers with original content creators as well as with other viewers of the video.

As used herein, a "facer ring" is a layering construct that allows a user to tag, pinpoint, or otherwise link layer content with a particular object or space identified within the underlying video clip. A facer ring can be viewed as a type of "portal" to view content that is associated with a video. That is, the facer ring (and even the layers mentioned earlier) allows content to be added or associated with a particular object or space. The adding process may be performed via drag and drop, selection, or any other linking technique. The facer ring is scalable and focuses on an area of interest (e.g., an object or perhaps any other area in a video) throughout a determined time period. The facer ring can move and may potentially go on (or even off) the screen at any point in time.

In the example shown in FIG. 13, the facer ring 1305 is associated with the basketball player who is dunking the ball into the hoop. As was described earlier in connection with FIG. 5, the embodiments are able to perform object segmentation 515 on the video clip to identify the different objects represented within the video clip. A listing of those objects may then be provided to a user who can then link or tag a facer ring to any one or more of those objects, as shown in FIG. 13. In this fashion, specific content can be associated with the identified object via use of the facer ring 1305. Any of the layer content mentioned earlier may be associated with the facer ring 1305 (e.g., images, videos, documents, spreadsheets, etc.).

Layers, specific layer content, or even facer rings can be marked by users using a favorites or bookmarks bar. Doing so will enable the user to be able to easily return to that specific layer, specific content, or facer ring.

As touched upon earlier, a facer ring can be added to a layer in multiple different ways. For instance, a facer ring can be added via a drag and drop option, where the facer ring is dropped over top of a particular object and then an association is formed between the facer ring and the object. For instance, if the facer ring is dropped within a threshold proximity (e.g., a predetermined number of pixels) relative to an identifiable object, then the facer ring can be snapped to a position immediately over top of the object and the association can be made.

Another option for creating a facer ring involves listing objects that have been identified by the ML engine. A user can then select any one of these identified objects and then select an option to associate a facer ring with that option. In some cases, when the user selects the object from the list of objects, the embodiments may optionally highlight or otherwise emphasize the object in the underlying video to enable the user to see which specific object he/she has selected. Highlighting may also be used in the snapping feature mentioned above, where an object is highlighted to indicate which object is being considered.

In some cases, the ML engine attempts to provide the identified object with a name that the ML engine generates based on its understanding of what the object is. For instance, the ML engine may identify the basketball player and may provide the name "player" to that identified object. Of course, the user can modify or edit the name as desired. Accordingly, different techniques may be employed to create a facer ring. If the ML engine is able to recognize the specific player's name, then the ML engine can name that player "object" with his/her actual name.

As an example, suppose a basketball player was a famous NBA player. The facer ring 1305 can be used to provide links or tags to the players statistics, previous highlights, interviews, article publications, brand names, sportswear, and so forth. Any of the layer content mentioned earlier can now be associated with a particular object (via the facer ring) represented within the underlying video clip in order to enhance or enrich a user's experience while viewing the video clip.

The facer ring 1305 may be visually formatted in any manner. In the example shown in FIG. 13, the facer ring 1305 is shown as having a ring shape that surrounds the object in the video clip, though other shapes may be used. The facer ring 1305 is also shown as including a number of handles, such as handle 1310. The handle 1310 can be used to adjust the properties of the facer ring 1305, including the size of the facer ring 1305, its position, its shape, and so forth. In this regard, the facer ring 1305 may be structured to include one or more handles that are manipulable to adjust a size of the facer ring 1305.

Additionally, the facer ring 1305 is selectable. For example, the pointer 1315 is shown as selecting the facer ring 1305. This selection may occur via any type of selection mechanism, including a traditional mouse, a stylus, or any type of touchscreen-based touch input. One result of selecting the facer ring 1305 is illustrated in FIG. 14.

Figure 14:
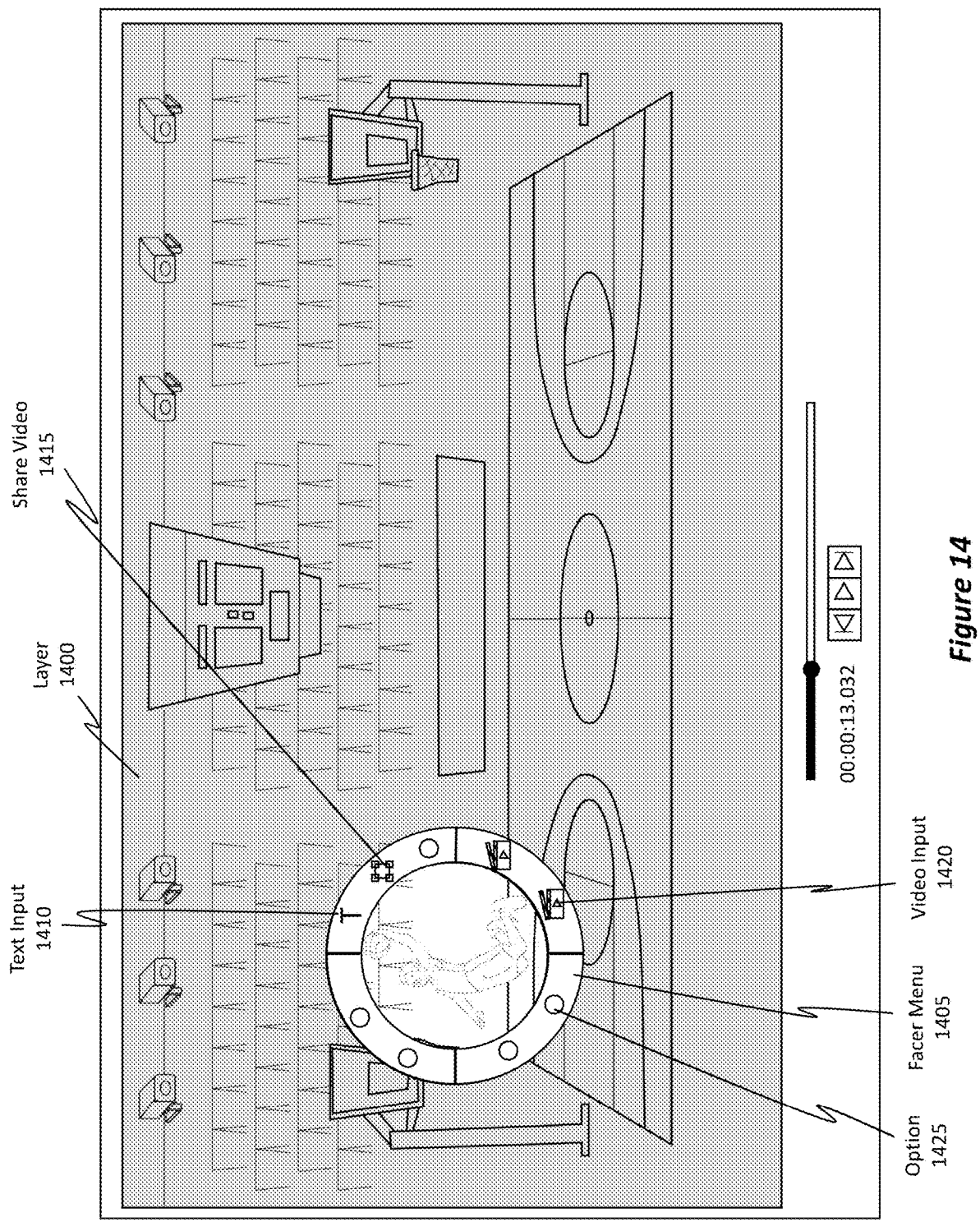
FIG. 14 illustrates a facer menu or a toggle wheel that may be displayed when using the facer ring.

FIG. 14 shows a layer 1400, which is representative of the layer 1300 from FIG. 13. As a result of selecting the facer ring 1305, the facer menu 1405 is displayed. In this example, the facer menu 1405 is shown as a toggle wheel-like menu that can toggle to display any number of menu items. Such menu items include, but are not limited to, a text input 1410, a share video 1415 input, a video input 1420, and another option 1425.

The menu may also include an option to share the facer ring 1305 with any number of other users. For instance, a so-called "facelet" may be configured as a facer ring hyperlink. This hyperlink is a transferable bookmark that can be sent to any other computing account or device. A facelet notifies a recipient regarding the availability of a facer ring, or perhaps an update to the facer ring (e.g., perhaps new content has been added to the facer ring). When the facelet is clicked by the receiving party, that party is connected with the facer ring and is able to surf the video, the attached content, and so on. The receiving party can also add new content to a new layer or to an existing layer, or even add new content to a facer ring, provided that party has adequate permissions. The receiving party can also read, review, comment, follow, or tag the facelet to his/her bookmarks or favorites.

The text input 1410 allows a user to enter or view text that will be (or has been) linked with the facer ring such that the text input will also be linked to the underlying object in the video clip. Any type of text may be entered or viewed, as was described earlier, including any type of article publication, comment, document, table, pdf, or even a chat conversation. The share video 1415 option allows a user to share the video clip, including the layer 1400, with any number of other users. The video input 1420 allows a user to record his/her own video that will be tagged or linked to the facer ring or another video that is linked with the facer ring or to view videos that have already been tagged to the facer ring. When the user or another user selects the facer ring, then the video content (and the text content or any other content tagged to the facer ring) will now be made available for those other users as well. The option 1425 represents any other service, feature, or option that may be added to a layer, including any of the layer content mentioned earlier. Due to its toggle wheel-like characteristics, any number of features or options may be provided by the facer ring. The videos, text, and other data mentioned above may be displayed in a popup window that overlaps the video content or it may be displayed in a new window, as was described earlier.

Figure 15:
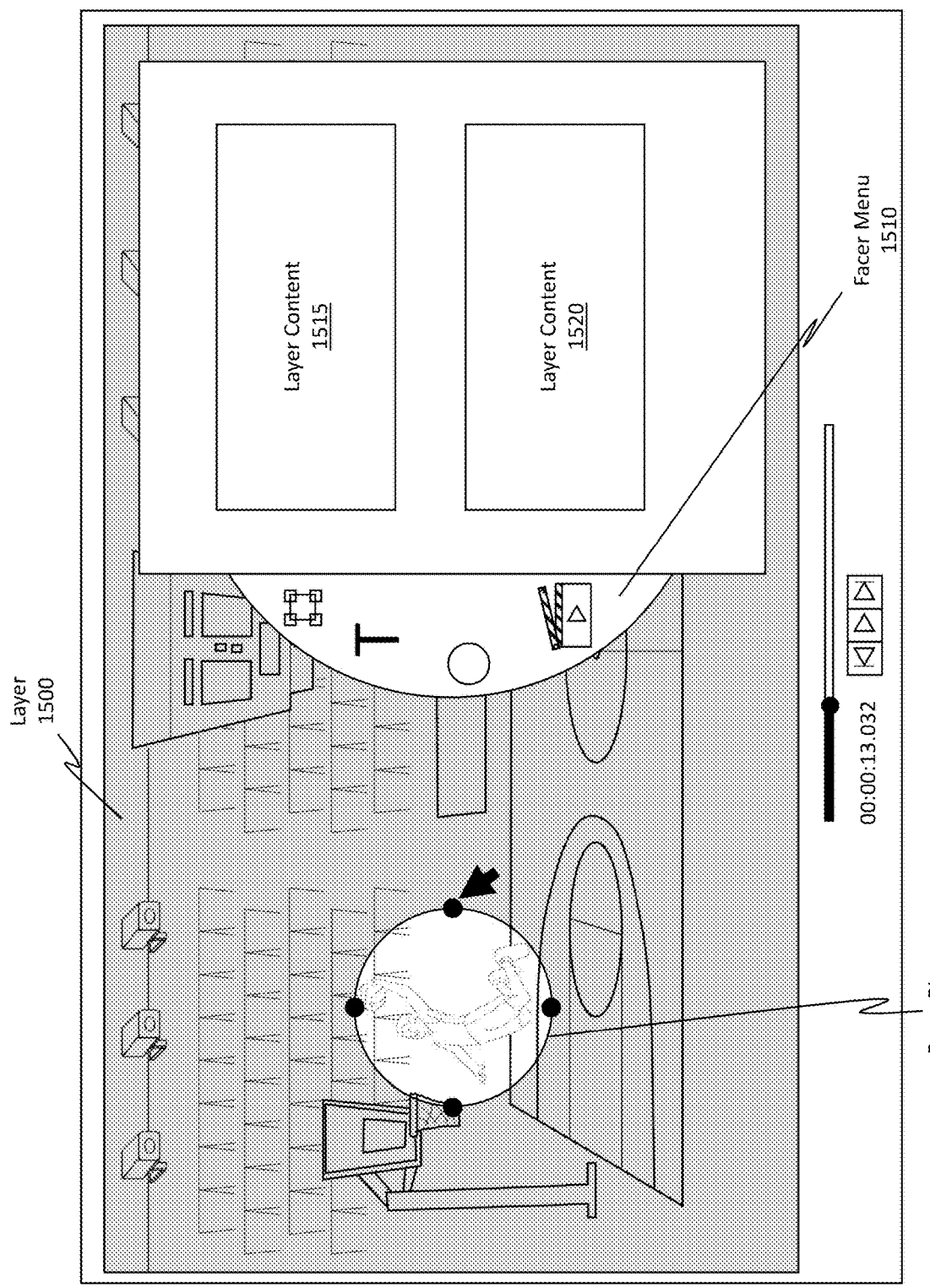
FIG. 15 illustrates another implementation of how a facer menu may be displayed when using a facer ring.

FIG. 15 illustrates an example layer 1500, which is representative of the layer 1300 from FIG. 13, and a facer ring 1505, which is representative of the facer ring 1305. Instead of implementing the facer menu as a toggle wheel around the facer ring itself, FIG. 15 shows how the facer menu 1510 may be displayed as a popup window that overlaps some of the video content in the video clip. Similar to the numerous features provided by the facer menu 1405 of FIG. 14, the facer menu 1510 may provide any number of features or services.

In some implementations, the facer menu 1510 may also display layer content 1515 and 1520. For instance, the layer content 1515 and 1520 may be any of the layer content mentioned thus far. By way of a specific example, the layer content 1515 may be a highlight video showing the basketball player's previous feats (or flounders), and the layer content 1520 may be a chat session in which multiple users are conversing about the player in real time.

As another example, the layer content 1515 may be the video feed from a different camera than the one that captured the underlying video in the video clip. For instance, perhaps the layer content 1515 is a video feed from the top of the basketball hoop, and the camera is pointing down toward the ground to allow viewers to watch as the basketball is slammed into the hoop. Similarly, the layer content 1520 may be another video feed, perhaps from a camera positioned mid court to allow viewers to watch the player's progression toward the hoop.

In some implementations, the layer may include additional content in addition to the facer ring. For example, the additional content may optionally include a stitched video clip that includes multiple different video clips stitched together. For instance, a user can generate a stitched video in which one player from one team is initially shown as passing a ball in one video clip. A different player from a different team is illustrated in a different video clip. These two clips may be stitched together to provide the illusion that the first player is passing the ball to the second player. Additional video clips may be stitched together to form a complete play or some other event. This stitched video may be provided as layer content.

Figure 16:
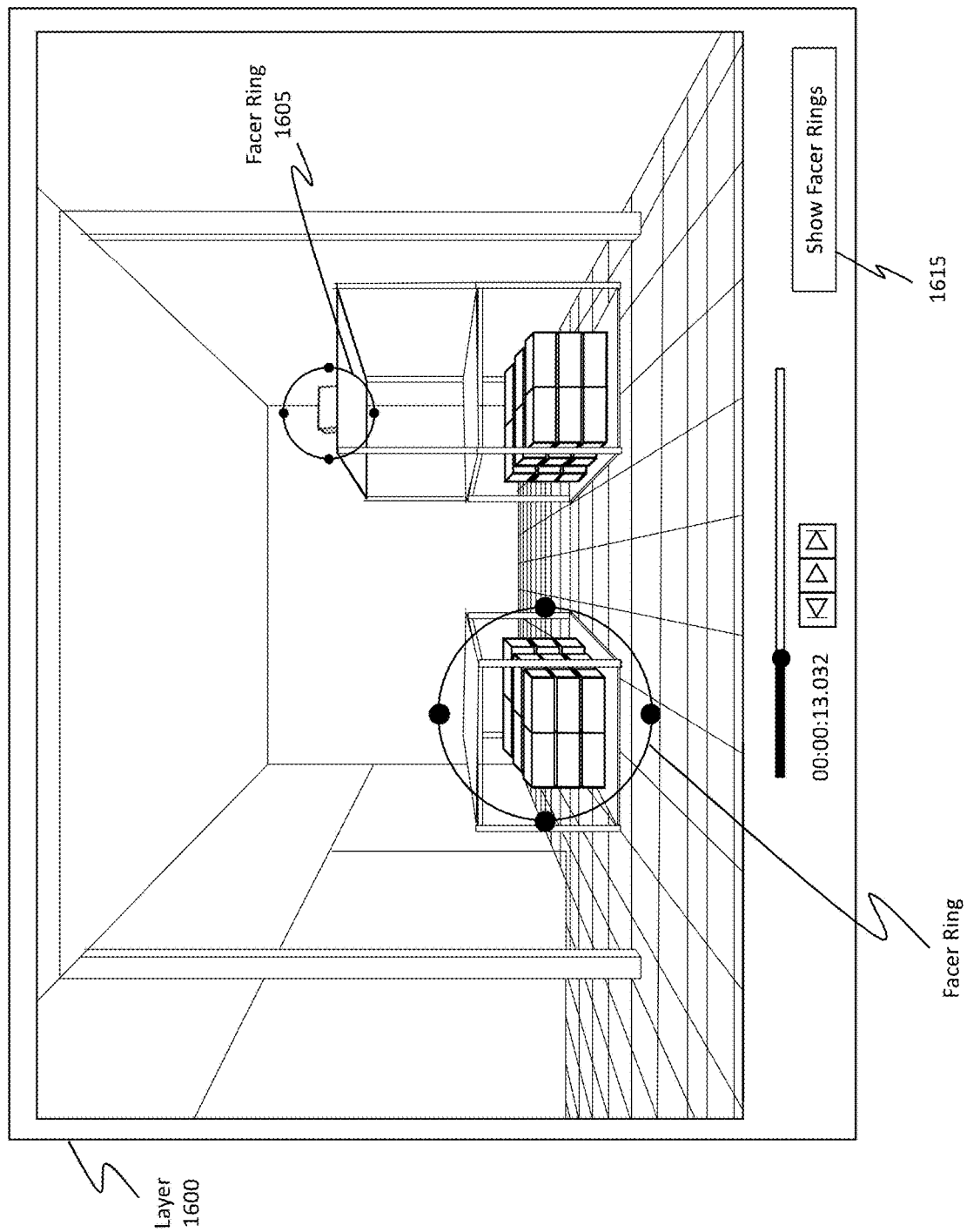
FIG. 16 illustrates how a single video clip or a single layer may have multiple facer rings.

FIG. 16 illustrates an example layer 1600, which is representative of any of the layers mentioned thus far. In this example scenario, multiple facer rings have been added to the layer 1600, as shown by facer ring 1605 and facer ring 1610. These facer rings may be configured in the manner mentioned earlier. In some instances, the facer rings may be temporarily hidden from view so as to not obstruct the viewing of the video clip. In such circumstances, a selectable user interface option may be provided, as shown by the option 1615. When option 1615 is selected, that selection may trigger the layer 1600 to visually display its facer rings. When the option 1615 is selected again, that selection may trigger the layer 1600 to visually hide its facer rings. Accordingly, some embodiments selectively display or selectively hide facer rings based on user input or perhaps based on some other triggering mechanism (e.g., perhaps the rings are to be hidden until a particular point in time in the video clip is reached during playback).

In some cases, the embodiments provide a facer ring content view portal that allows scrolling through a listing of all the facer rings associated with a particular video clip. The portal may also allow scrolling through the actual content provided by the facer rings.

Accordingly, in some embodiments, the facer ring may initially be transparent. When a user selects the option 1615, then that selection may trigger the facer ring to become visible in the user interface. Consequently, the facer ring may be visually displayed overtop of its corresponding object.

Facer Rings Track Object Movement

Figure 17:
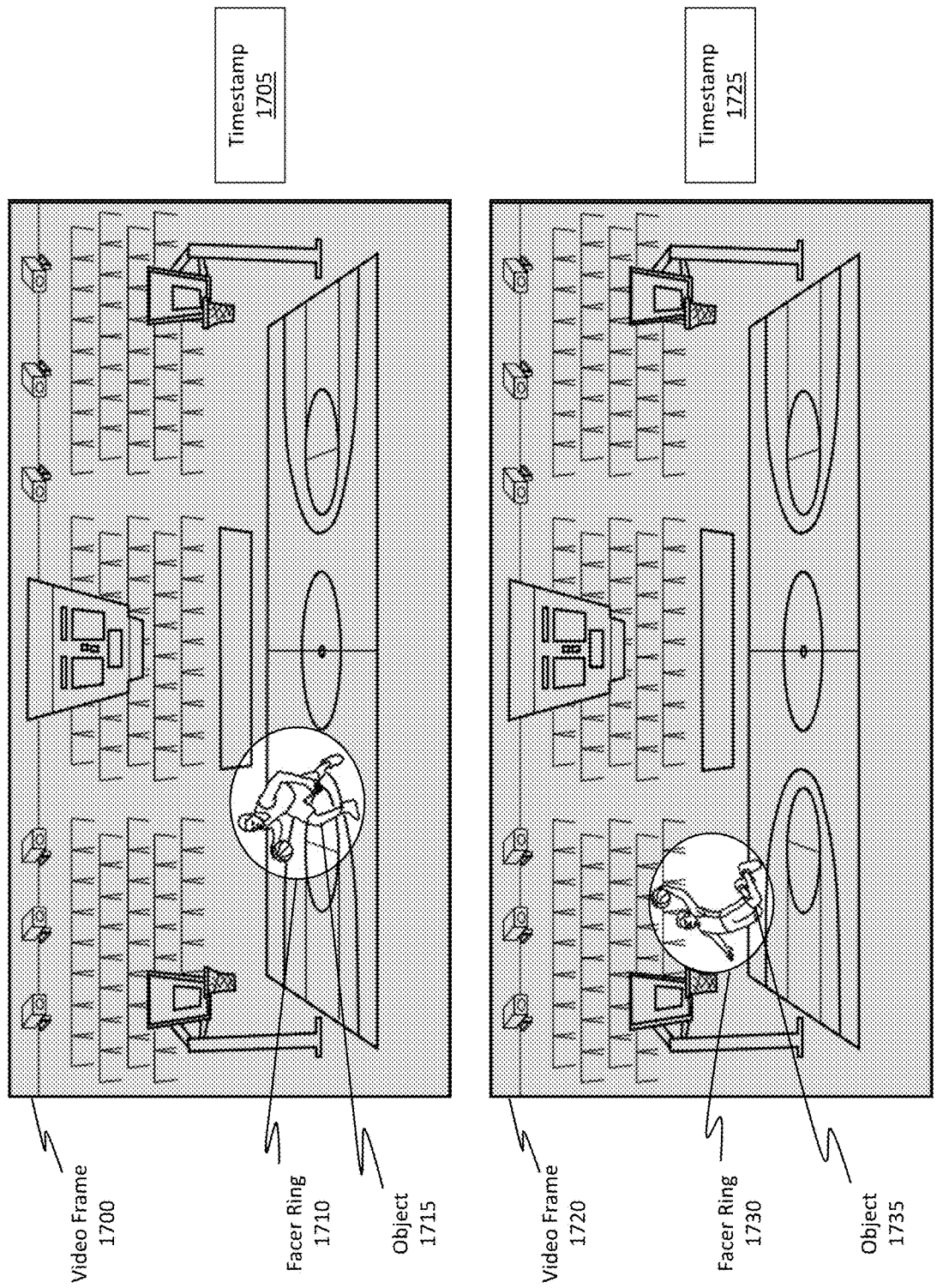
FIG. 17 illustrates an example scenario in which a facer ring tracks a path followed or created by an object included within a video clip.
Figure 18:
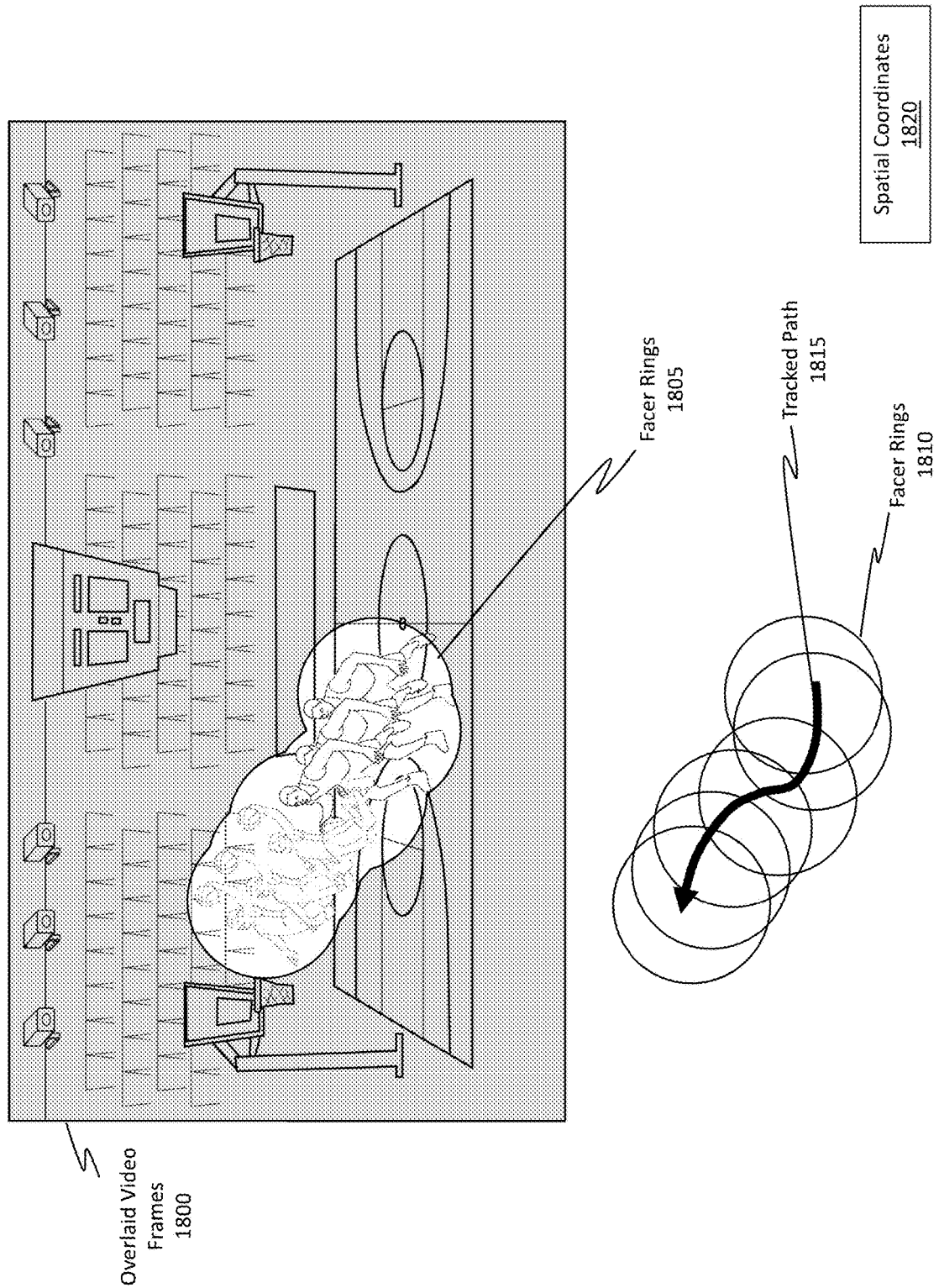
FIG. 18 provides another illustration reflecting how a facer ring can track an object's path over time.

A video is formed from multiple "frames" or "still images" that, when viewed at a sufficiently fast enough rate, give the appearance of motion in the video. The phrase "frame rate" refers to the speed by which those video frames are played. The frame rate is often expressed as FPS (frames per second). Typical frame rates are 24 FPS, 25 FPS, 30 FPS, 60 FPS, and 120 FPS, though other frame rates may be used as well. As discussed previously, the embodiments are able to use a ML engine to analyze a video to identify objects. What occurs, then, is that the ML engine analyzes each of the video frames and identifies objects in each frame. By identifying objects in each frame, the embodiments are able to track the supposed "motion" of an object throughout the duration of a video clip. By tracking the object's motion, the embodiments are also able to modify a facer ring so that its coordinates within the layer line up or coincide with the coordinates of the identified object. FIGS. 17 and 18 illustrate these concepts.

FIG. 17 shows a first video frame 1700, which is one video frame of multiple video frames forming the video clip mentioned earlier (e.g., video clip 410). Video frame 1700 has a particular timestamp 1705. Additionally, there is a facer ring 1710 that has been added to a layer associated with the video clip (and with the video frame 1700), where this facer ring 1710 is focused on the object 1715 (i.e. the basketball player).

FIG. 17 shows a second video frame 1720 with a corresponding timestamp 1725. Timestamp 1725 is later in time relative to the timestamp 1705. For instance, whereas the player (i.e. object 1715) was on his feet dribbling the ball in video frame 1700, the player is now shown dunking the ball in video frame 1720. The facer ring 1730 is focused on the object 1735, which is representative of the player. The facer rings 1710 and 1730 are actually the same facer ring. Likewise, the objects 1715 and 1735 are the same objects.

That being said, both the facer rings 1710 and 1730 and the objects 1715 and 1735 are located at different coordinates or different positions because the object is moving throughout time. The embodiments are able to configure the facer ring to track the movement of its corresponding object. Because the ML engine has identified the object in the different video frames of the video clip, the embodiments are able to adjust the coordinates or positioning of the facer ring to track the movement of its object over time. This tracking motion may be performed automatically without user involvement. Here, a user need only select which object that user would like to have a facer ring, and then the embodiments automatically generate a facer ring and cause that ring to track the object's path.

FIG. 18 shows multiple overlaid video frames 1800 overlaid on top of one another. Together, these overlaid frames illustrate the player's movement as he approaches the hoop. FIG. 18 also shows a number of facer rings 1805 tracking the player's movement.

For instance, the facer rings 1810 are shown as shifting position to reflect a tracked path 1815 followed by the player as he approaches the hoop. The facer ring is able to track this path so as to continuously align with the player, even when the player moves. When users are viewing the video clip, they will be presented with a scenario in which the facer ring is shown as tracking the object's path as that object moves throughout time. In this manner, the spatial coordinates (e.g., spatial coordinates 1820) track the spatial coordinates of the object over time.

The embodiments are also able to set time durations for the lifespans of facer rings. For instance, even though a layer may have a duration spanning the entire duration of a video clip, there is an option to cause a facer ring to have a shorter lifespan than that of the layer. By way of example, if a facer ring is associated with a particular player, then that facer ring may be "alive" only for as long as the player is visible in the video clip. If the player walks over to the sidelines (and thus is not visible in the video clip), then the facer ring can track the player's visible movements. Once the player is no longer visible, then the facer ring can be terminated so as to coincide with the player leaving the video clip.

Another example will be helpful. Suppose a content creator (e.g., Gary's Scuba School) creates and releases a promotional video. The creator creates a video and then adds layers and facer rings to the video in order to engage with customers in a new manner. Viewers of the layered video are now not only able to enjoy the video, but they are also able to interact with the content creator in numerous different ways (e.g., by adding their own videos to a layer, by chatting with the content creator, etc.).

To continue with this example, now suppose a student of the scuba shop made a video of her own recounting an experience she had with Gary's Scuba School. Further suppose the student mentions the Scuba School in the new video. The disclosed embodiments are able to use the ML engine to identify the spoken language and/or any other visible objects (e.g., perhaps a scuba tank) in the video in order to identify a reference to Gary's Scuba School. A layer may be generated and new layer content, perhaps even a facer ring, can be added to the student's video. The new layer content can then reference a website owned by Gary's Scuba School. Such operations can be performed automatically using the ML engine. A notification may also be delivered to the original content creator to indicate how another video is referencing his School. A new layer can then be added to the original video with a link to the student's video. Now, the two videos are linked and can be easily navigated to and from one another.

Searching Against Other Layers and Other Facer Rings

Figure 19:
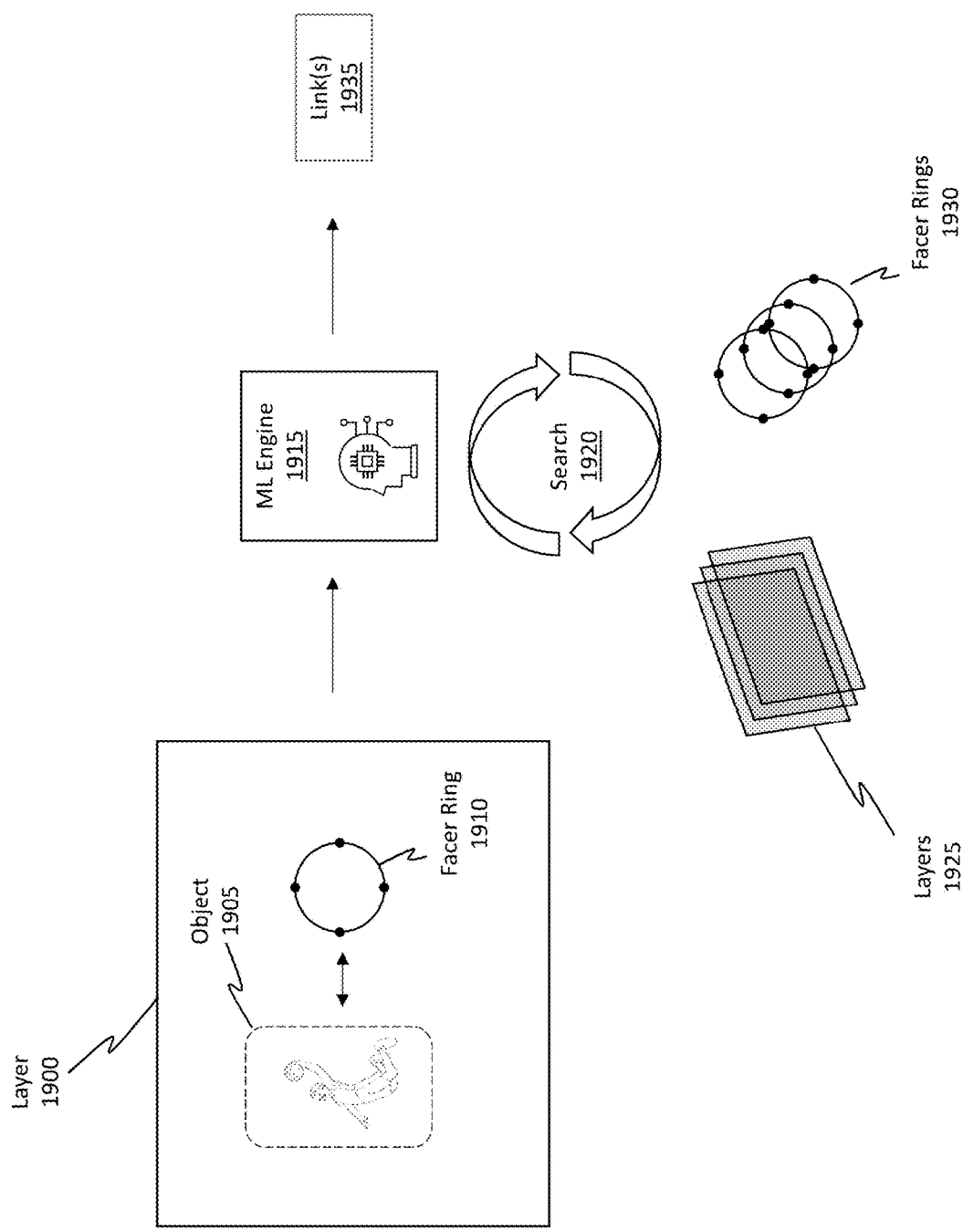
FIG. 19 illustrates how machine learning can be used to identify when other layers have facer rings directed at the same object.

As has been described above, any number of layers and any number of facer rings may be associated with a video clip or a video recording. That being said, it is often beneficial to reduce or eliminate duplicate subject matter or at least provide links between duplicate subject matter. With that in mind, the embodiments are able to search other video clips, video records, layers, and even facer rings to determine whether layer or facer content has already been created or has already been tagged with a particular object. If that is the case, then some embodiments can merge or link a newly created facer ring or layer with an existing facer ring or layer focused on the same or sufficiently similar content (e.g., content that satisfies a similarity threshold). FIG. 19 is illustrative of these concepts.

FIG. 19 shows a layer 1900, an object 1905, and a facer ring 1910 associated with the object 1905. Each of these entities is representative of their corresponding entities mentioned thus far.

In some implementations, when the facer ring 1910 is generated for the particular object 1905, the embodiments use a ML engine 1915 (e.g., perhaps the same ML engine 510 from FIG. 5 or perhaps a different ML engine trained in a different manner) to execute a search 1920 on other existing layers 1925 and/or other existing facer rings 1930. The search 1920 is performed in an effort to determine whether other layer content or facer ring content has already been created for the same object 1905.

By way of example, suppose there is a video recording of a basketball game. Different users create their own respective video clips and enhance those clips using the layering and facer ring techniques disclosed herein. For instance, suppose a first user generates a facer ring for the basketball player while he is performing his slam dunk.

Now, suppose a second user has created a different video clip and is also generating a facer ring for the same basketball player while he is performing his slam dunk. In this example scenario, there are now two video clips and two different facer rings. In some cases, it may be advantageous to link or otherwise associate those two facer rings together, as shown by link(s) 1935. To do so, the ML engine 1915 is able to conduct a search on a repository or data store of video clips, which are being hosted by a data center, and is able to search for layers and facer rings tagged to the same identified object. For instance, objects may be tagged with metadata to give them an identifier. That identifier may be repeated for different video clips where the same object is represented. The embodiments can search to determine whether layer content or facer rings have been associated with that same object.

If the search results return with an indication that one or more other facer rings or layer content are also directed to the object 1905, then a link may be established between those multiple different facer rings. This link can be structured to allow any type of supplemental content to be shared amongst those facer rings. For instance, suppose a first user recorded her video reaction to the player's slam dunk and suppose a second user provided a highlight reel showing other slam dunks by that same player. The first user's supplemental data can be shared with the second user, and the second user's supplemental data can be shared with the first user via the facer ring (i.e. the content may be included in the facer ring's menu, as was described earlier).

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The disclosed methods may be performed by a cloud server, by a client device, or by a combination of a cloud server and a client device.

Figure 20:
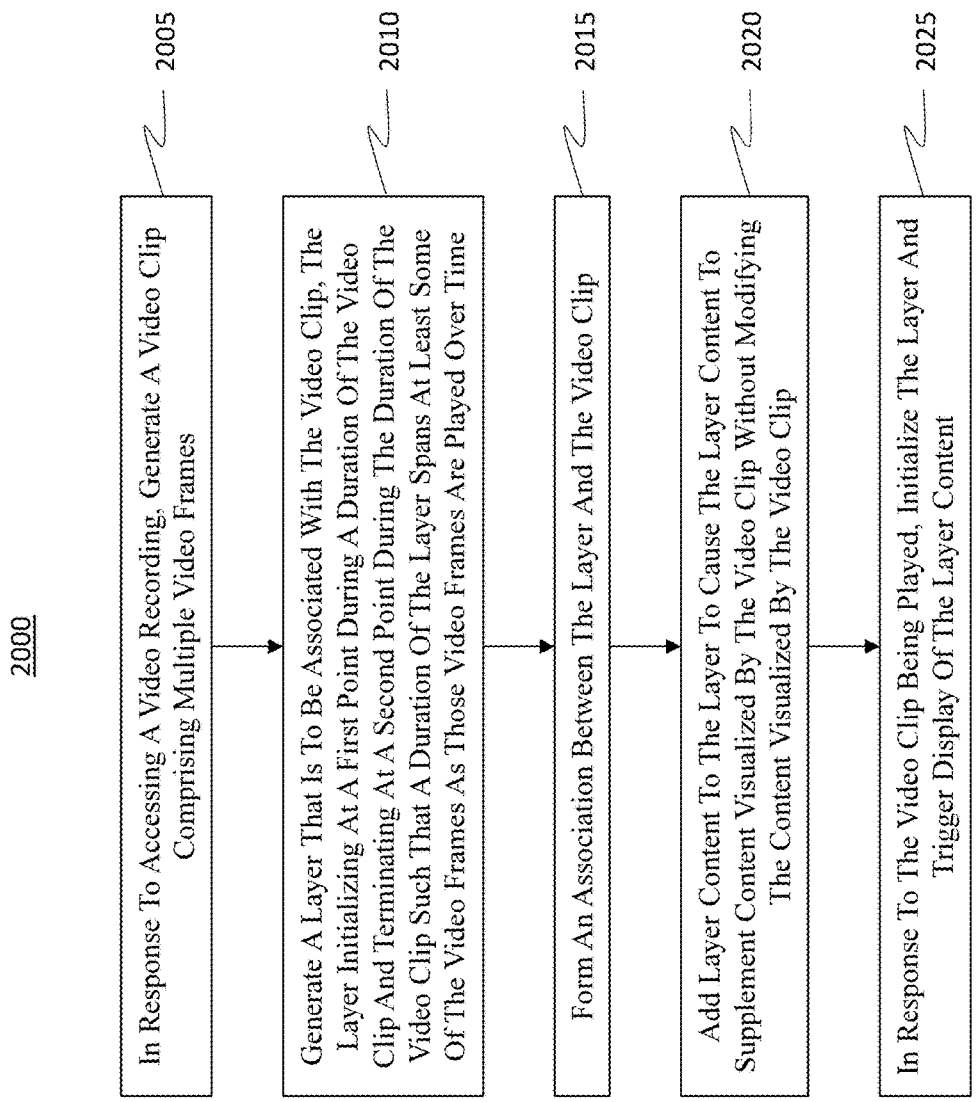
FIG. 20 illustrates a flowchart of an example method for adding one or more layers to a video clip.

Attention will now be directed to FIG. 20, which illustrates a flowchart of an example method 2000 for supplementing a video clip with additional information without modifying the original content included within the video clip. This supplementation process is beneficially achieved through the use of the layers mentioned earlier.

Initially, method 2000 includes act 2005 where, in response to accessing a video recording (e.g., video 405 from FIG. 4), the embodiments generate a video clip (e.g., video clip 410) comprising a plurality of video frames (e.g., video frames 1700 and 1720 in FIG. 17); this is perhaps performed by trimming the video recording. Adjusting the start 415 indicator and the end 420 indicator in FIG. 4 is an example process of "trimming" or clipping the video recording. In some implementations, the video clip may not be trimmed and may instead have a duration that matches the duration of the video recording.

Method 2000 also includes an act (act 2010) of generating a layer that is to be associated with the video clip. Here, the layer initializes at a first point during a duration of the video clip and terminates at a second point during the duration of the video clip. As a consequence, a duration of the layer spans at least some video frames included in the plurality of video frames as those video frames are played over time. In some cases, the first point when the layer initialized coincides with a start time of the video clip while in other cases the first point is a point in time subsequent to the video clip's start time. Similarly, in some cases, the second point when the layer terminates coincides with an end time of the video clip while in other cases the second point is a point in time prior to the video clip's end time.

Method 2000 also includes an act (act 2015) of forming an association between the layer and the video clip. This association may involve alignment of the video clip and the layer's spatial coordinates and timing such that the video clip and the layer are synchronized with one another.

Act 2020 involves adding layer content (e.g., layer content 910, 915, 920, 925, 930, etc. from FIG. 9) to the layer to cause the layer content to supplement content visualized by the video clip. Beneficially, this supplementation occurs without modifying the content visualized by the video clip.

Then, in response to the video clip being played, act 2025 involves initializing the layer and triggering display of the layer content. FIG. 11 is an example in which layer content is being displayed.

Figure 21:
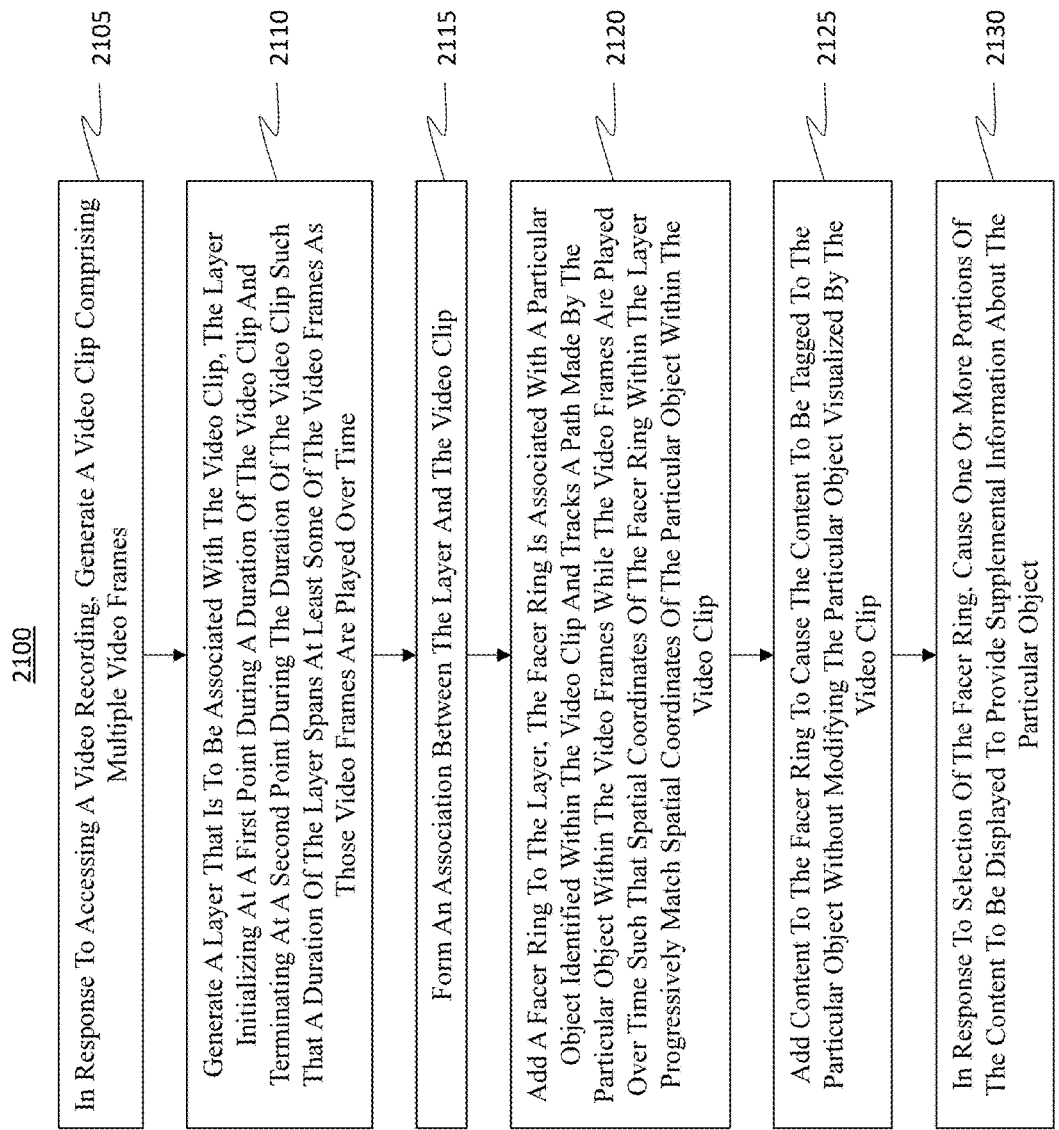
FIG. 21 illustrates a flowchart of an example method for adding one or more facer rings to a video clip.

FIG. 21 illustrates a flowchart of an example method 2100 for supplementing a video clip by adding supplemental information to the video clip via use of a facer ring while refraining from modifying the original content included within the video clip.

In response to accessing a video recording, act 2105 involves generating a video clip comprising a plurality of video frames; this is perhaps performed by trimming the video recording. Act 2110 involves generating a layer that is to be associated with the video clip. As discussed earlier, the layer initializes at a first point during a duration of the video clip and terminates at a second point during the duration of the video clip. As a result, a duration of the layer spans at least some video frames included in the plurality of video frames as those at least some video frames are played over time.

Method act 2115 includes forming an association between the layer and the video clip. After this association is formed, act 2120 is performed.

Act 2120 involves adding a facer ring (e.g., facer ring 1710 from FIG. 17) to the layer. Notably, the facer ring is associated with a particular object (e.g., object 1715) identified within the video clip. This identification process may be performed using the ML engine mentioned earlier. That is, the ML engine may be configured to perform object segmentation on the video clip in order to identify objects (including the so-called "particular object") included within the video clip. Furthermore, the facer ring is configured to track a path made by the particular object (e.g., tracked path 1815 from FIG. 18) within the video frames while the video frames are being played over time. Consequently, spatial coordinates of the facer ring within the layer progressively match or track spatial coordinates of the particular object within the video clip, as shown by the spatial coordinates 1820 in FIG. 18.

Act 2125 involves adding content (e.g., any of the layer content mentioned earlier, which may be accessed via options such as the text input 1410 option, the share video 1415 option, the video input 1420 option, and the option 1425 shown in FIG. 14) to the facer ring. Performing this operation causes the content to be tagged to the particular object without modifying the particular object visualized by the video clip.

In response to selection of the facer ring, act 2130 involves causing one or more portions of the content to be displayed to provide supplemental information about the particular object. FIG. 15 is representative of the ability of the embodiments to use a facer ring to display supplemental content.

In some cases, the method 2100 may include additional acts. For instance, an additional act may involve causing the machine learning (ML) engine to perform object segmentation on the video clip to identify objects in the video clip, including identifying the particular object mentioned earlier. Then, while the video clip is paused (such that only a particular one of the video frames is displayed), another act may involve receiving user input directed at the particular object. Here, the user input may indicate the facer ring is to be created for the particular object.

Then, in response to the user input directed at the particular object within the particular one video frame, another act may include generating the facer ring and causing the facer ring to be associated with all instances of the particular object, as identified by the ML engine, across all of the video frames. As a consequence, when the video clip is played, the facer ring visually moves over top of the video clip in order to track the path made by the particular object.

In some cases, multiple video clips may be generated based off of the video recording. Furthermore, multiple layers may be generated based on the video clip and/or the video clips. Even further, a different layer, which is included in the multiple layers, may be structured to include a different facer ring that is also associated with the particular object. As described earlier, the embodiments are also able to perform searches against the different layers and even against the different facer rings.

For example, in response to the facer ring being added to the layer and being associated with the particular object, the embodiments may cause a machine learning (ML) engine to search other layers included in the multiple layers to determine whether the other layers include facer rings associated with the particular object, which is also represented in the multiple video clips. The embodiments may also identify other facer rings included in other layers and may then generate an association between the other facer rings and the original facer ring.

Accordingly, the disclosed embodiments bring about substantial improvements to the technical art of video editing. The embodiments help reduce compute expenses while also improve or enrich a user's experience.

Example Computer/Computer Systems

Figure 22:
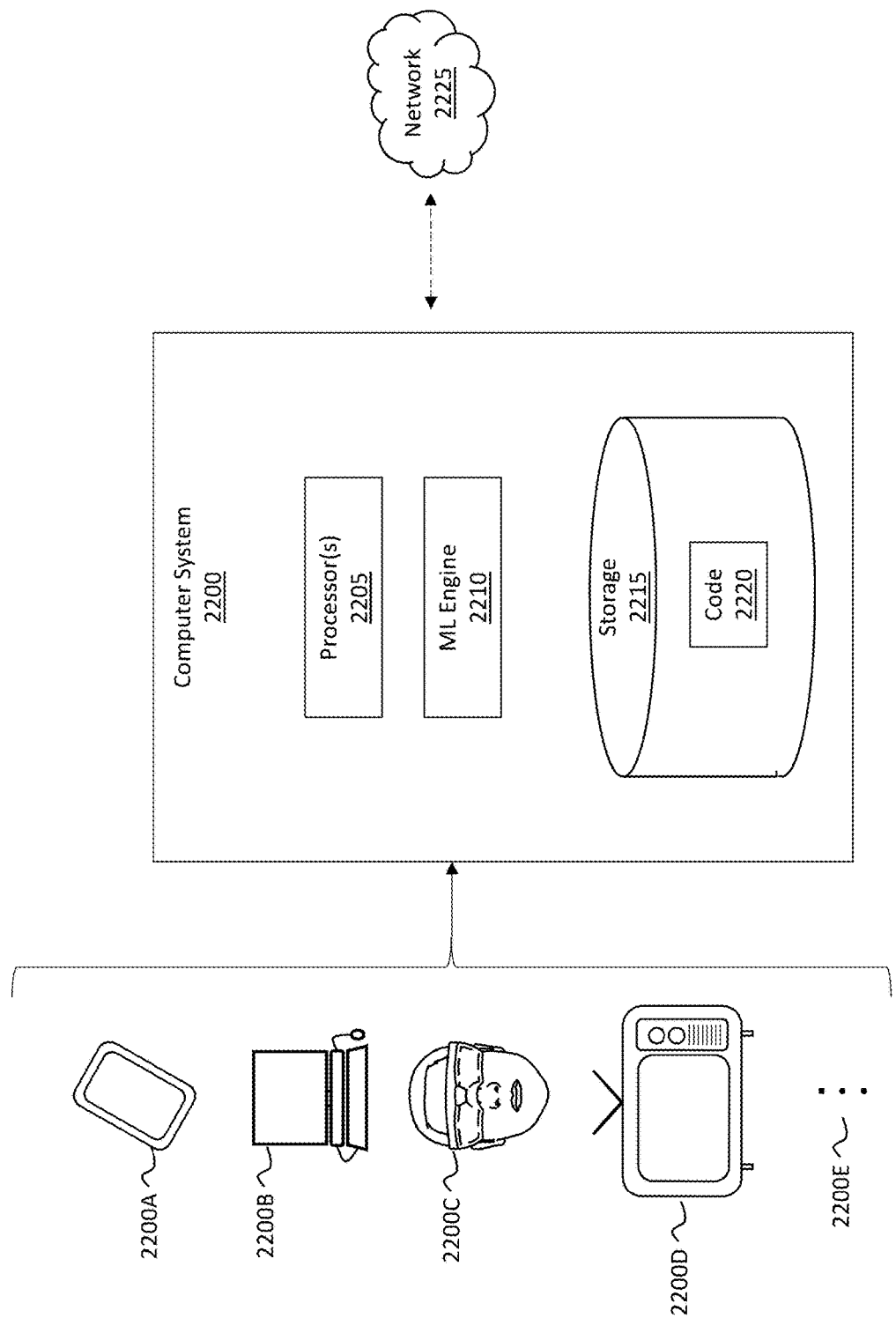
FIG. 22 illustrates an example computer system that may be configured or structured to perform any of the disclosed operations.

Attention will now be directed to FIG. 22 which illustrates an example computer system 2200 that may include and/or be used to perform any of the operations described herein. Computer system 2200 may take various different forms. For example, computer system 2200 may be embodied as a tablet 2200A, a desktop or laptop 2200B, a wearable device 2200C, a smart television 2200D, a mobile device, or any other type of standalone device. The ellipsis 2200E illustrates how the computer system 2200 may be implemented in other form factors as well. Computer system 2200 may also be a distributed system that includes one or more connected computing components/devices that are in communication with computer system 2200.

In its most basic configuration, computer system 2200 includes various different components. FIG. 22 shows that computer system 2200 includes one or more processor(s) 2205 (aka a "hardware processing unit"), a ML engine 2210, and storage 2215.

Regarding the processor(s) 2205, it will be appreciated that the functionality described herein can be performed, at least in part, by one or more hardware logic components (e.g., the processor(s) 2205). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The ML engine 2210 may be implemented as a specific processing unit (e.g., a dedicated processing unit as described earlier) configured to perform one or more specialized operations for the computer system 2200. As used herein, the terms "executable module," "executable component," "component," "module," or "engine" can refer to hardware processing units or to software objects, routines, or methods that may be executed on computer system 2200. The different components, modules, engines, and services described herein may be implemented as objects or processors that execute on computer system 2200 (e.g. as separate threads). The ML engine 2210 (or perhaps even just the processor(s) 2205) can be configured to perform any of the disclosed method acts or other functionalities.

Storage 2215 may be physical system memory, which may be volatile, non-volatile, or some combination of the two. The term "memory" may also be used herein to refer to non-volatile mass storage such as physical storage media. If computer system 2200 is distributed, the processing, memory, and/or storage capability may be distributed as well.

Storage 2215 is shown as including executable instructions (i.e. code 2220). The executable instructions represent instructions that are executable by the processor(s) 2205 (or perhaps even the ML engine 2210) of computer system 2200 to perform the disclosed operations, such as those described in the various methods.

The disclosed embodiments may comprise or utilize a special-purpose or general-purpose computer including computer hardware, such as, for example, one or more processors (such as processor(s) 2205) and system memory (such as storage 2215), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2200 may also be connected (via a wired or wireless connection) to external sensors (e.g., one or more remote cameras) or devices via a network 2225. For example, computer system 2200 can communicate with any number devices or cloud services to obtain or process data. In some cases, network 2225 may itself be a cloud network. Furthermore, computer system 2200 may also be connected through one or more wired or wireless networks 2225 to remote/separate computer systems(s) that are configured to perform any of the processing described with regard to computer system 2200.

A "network," like network 2225, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2200 will include one or more communication channels that are used to communicate with the network 2225. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for supplementing a video clip with additional information without modifying original content included within the video clip, said method comprising:
   in response to accessing a video recording, generating a video clip comprising a plurality of video frames;
   generating a layer that is to be associated with the video clip, wherein the layer initializes at a first point during a duration of the video clip and terminates at a second point during the duration of the video clip such that a duration of the layer spans at least some video frames included in the plurality of video frames as those at least some video frames are played over time;
   forming an association between the layer and the video clip; and
   adding a facer ring to the layer, wherein the facer ring is associated with a particular object identified within the video clip, and wherein the facer ring tracks a path made by the particular object within the plurality of video frames while the plurality of video frames are being played over time such that spatial coordinates of the facer ring within the layer progressively match spatial coordinates of the particular object within the video clip.

2. The method of claim 1, wherein the facer ring is initially transparent, and wherein selection of a user interface element triggers the facer ring to be visible and to be visually displayed overtop of the particular object.

3. The method of claim 1, wherein the facer ring includes one or more handles that are manipulable to adjust a size of the facer ring.

4. The method of claim 1, wherein the method further includes:
   causing a machine learning (ML) engine to perform object segmentation on the video clip to identify objects in the video clip, including identifying said particular object;
   while the video clip is paused such that only a particular one video frame in the plurality of video frames is displayed, receiving user input directed at the particular object, the user input indicating the facer ring is to be created for the particular object; and
   in response to the user input directed at the particular object within the particular one video frame, generating the facer ring and causing the facer ring to be associated with all instances of the particular object, as identified by the ML engine, across all video frames in the plurality of video frames such that, when the video clip is played, the facer ring visually moves over top of the video clip in order to track the path made by the particular object.

5. The method of claim 1, wherein the layer includes multiple facer rings, including said facer ring.

6. The method of claim 1, wherein:
   multiple video clips are generated based off of the video recording,
   multiple layers are generated based on the video clip and/or the video clips, and
   a different layer, which is included in the multiple layers, includes a different facer ring that is also associated with the particular object.

7. The method of claim 6, wherein the method further includes:
   in response to the facer ring being added to the layer and being associated with the particular object, cause a machine learning (ML) engine to search other layers included in the multiple layers, including searching the different layer, to determine whether the other layers include facer rings associated with the particular object, which is also represented in the multiple video clips;
   identifying the different facer ring included in the different layer; and
   generating an association between the different facer ring and said facer ring.

8. The method of claim 1, wherein the method is performed by a cloud server.

9. The method of claim 1, wherein the layer includes additional content in addition to the facer ring, and wherein the additional content includes a stitched video clip that includes multiple different video clips stitched together.

10. One or more hardware storage devices that store instructions that are executable by one or more processors of a computer system to cause the computer system to at least:
- in response to accessing a video recording, generate a video clip comprising a plurality of video frames;
- generate a layer that is to be associated with the video clip, wherein the layer initializes when the video clip starts and terminates when the video clip ends such that a duration of the layer spans the plurality of video frames as those video frames are played over time;
- form an association between the layer and the video clip; and
- add a facer ring to the layer, wherein the facer ring is associated with a particular object identified within the video clip, and wherein the facer ring tracks a path made by the particular object within the plurality of video frames while the plurality of video frames are being played over time such that spatial coordinates of the facer ring within the layer progressively match spatial coordinates of the particular object within the video clip.

11. The method of claim 1, further comprising:
- adding content to the facer ring to cause the content to be tagged to the particular object without modifying the particular object visualized by the video clip; and
- in response to selection of the facer ring, causing one or more portions of the content to be displayed to provide supplemental information about the particular object.

12. The one or more hardware storage devices of claim 10 that store further instructions that are executable by one or more processors of the computer system to cause the computer system to:
- add content to the facer ring to cause the content to be tagged to the particular object without modifying the particular object visualized by the video clip; and
- in response to selection of the facer ring, cause one or more portions of the content to be displayed to provide supplemental information about the particular object.

13. A computer system for supplementing a video clip with additional information without modifying original content included within the video clip, comprising:
- one or more processors; and
- one or more computer-readable media having stored thereon executable instructions that when executed by the one or more processors configure the computer system to perform at least the following:
  - in response to accessing a video recording, generate a video clip comprising a plurality of video frames;
  - generate a layer that is to be associated with the video clip, wherein the layer initializes when the video clip starts and terminates when the video clip ends such that a duration of the layer spans the plurality of video frames as those video frames are played over time;
  - form an association between the layer and the video clip; and
  - add a facer ring to the layer, wherein the facer ring is associated with a particular object identified within the video clip, and wherein the facer ring tracks a path made by the particular object within the plurality of video frames while the plurality of video frames are being played over time such that spatial coordinates of the facer ring within the layer progressively match spatial coordinates of the particular object within the video clip.

* * * * *